United States Patent [19]
Demas et al.

[11] Patent Number: 5,499,199
[45] Date of Patent: Mar. 12, 1996

[54] DISTANCE MEASURING SYSTEM

[75] Inventors: James G. Demas, 5037 ½ Rosewood Ave., Los Angeles, Calif. 90004; Nicholas G. Demas, 5249 Watson Rd., Cookeville, Tenn. 38501; John G. Demas, 4182 Seton Cir., Palm Harbor, Fla. 34683; Leonidas G. Demas, 9 Academy Ct., Bedminster, N.J. 07921; Frank Cornett, Cookeville, Tenn.

[73] Assignees: James G. Demas, Los Angeles, Calif.; Nicholas G. Demas, Cookeville, Tenn.; John G. Demas, Palm Harbor, Fla.; Leonidas G. Demas, Bedminster, N.J.

[21] Appl. No.: 131,755

[22] Filed: Oct. 5, 1993

[51] Int. Cl.$^6$ .............................. G01B 7/14; G01S 13/74
[52] U.S. Cl. ............................................ 364/561; 342/458
[58] Field of Search ...................... 364/410, 561, 364/569, 516, 444; 342/450, 458, 457, 46, 47; 377/24.2, 5, 24.1

[56] References Cited

U.S. PATENT DOCUMENTS

| | | | |
|---|---|---|---|
| 3,530,470 | 9/1970 | Sheftelman et al. | 342/46 |
| 3,631,487 | 12/1971 | Huntsinger | 343/7.3 |
| 3,824,469 | 7/1974 | Ristenbatt | 342/42 |
| 3,868,692 | 2/1975 | Woodard et al. | 342/458 |
| 4,113,382 | 9/1978 | Freudenschuss | 343/6.5 R X |
| 4,136,394 | 1/1979 | Jones et al. | 364/561 |
| 4,163,233 | 7/1979 | Becker | 343/12 R |
| 4,278,977 | 7/1981 | Nossen | 343/6.5 LC |
| 4,455,556 | 6/1984 | Koshio et al. | 343/7.3 |
| 4,698,781 | 10/1987 | Cockerell, Jr. | 364/561 |
| 4,703,444 | 10/1987 | Storms, Jr. et al. | 364/561 |
| 4,751,689 | 6/1988 | Kobayashi | 367/127 |
| 4,815,020 | 3/1989 | Cormier | 364/561 X |
| 4,820,041 | 4/1989 | Davidson et al. | 356/1 |
| 5,044,634 | 9/1991 | Dudley | 273/32 R |
| 5,046,839 | 9/1991 | Krangle | 273/32 R X |

OTHER PUBLICATIONS

Realistic Service Manual TRC–503 Voice Actuated FM Transceiver 1–26 (1988).

*Primary Examiner*—Ellis B. Ramirez
*Assistant Examiner*—Melanie Kemper
*Attorney, Agent, or Firm*—Banner & Allegretti, Ltd.

[57] ABSTRACT

A distance measuring system includes a base unit and a remote unit. The remote unit transmits a first radio frequency signal to the base unit. The base unit transmits a second radio frequency signal upon receipt of the first radio frequency signal from the remote unit. The remote unit measures the time between transmission of the first radio frequency signal and receipt of the second radio frequency signal, thereby enabling the distance between the base unit and the remote unit to be ascertained. The accuracy of the measured distance may be improved by averaging additional measurement cycles.

20 Claims, 20 Drawing Sheets

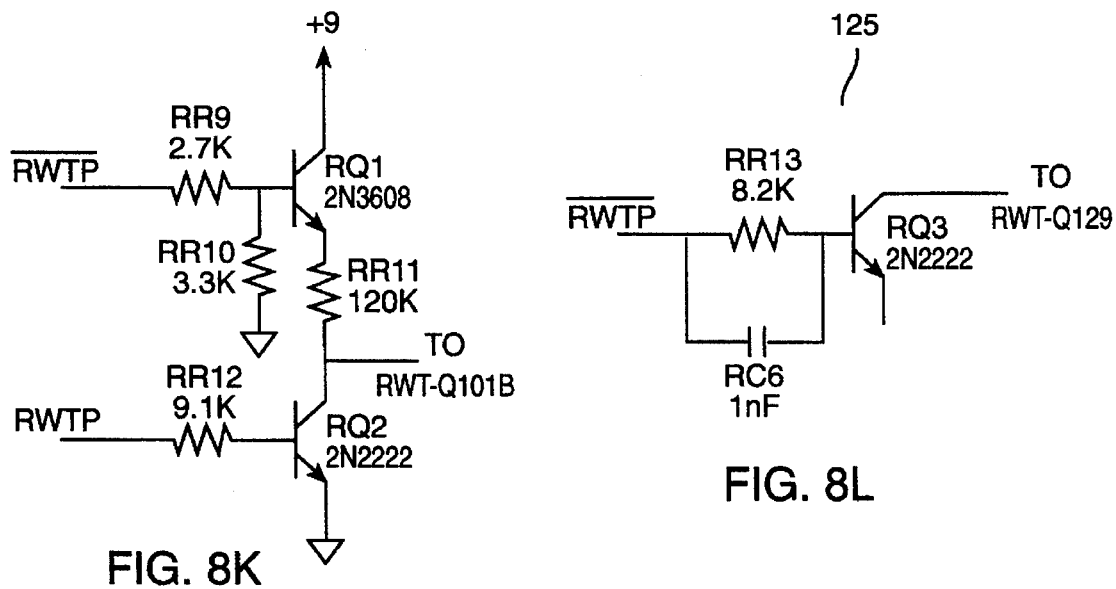
FIG. 8K
FIG. 8L
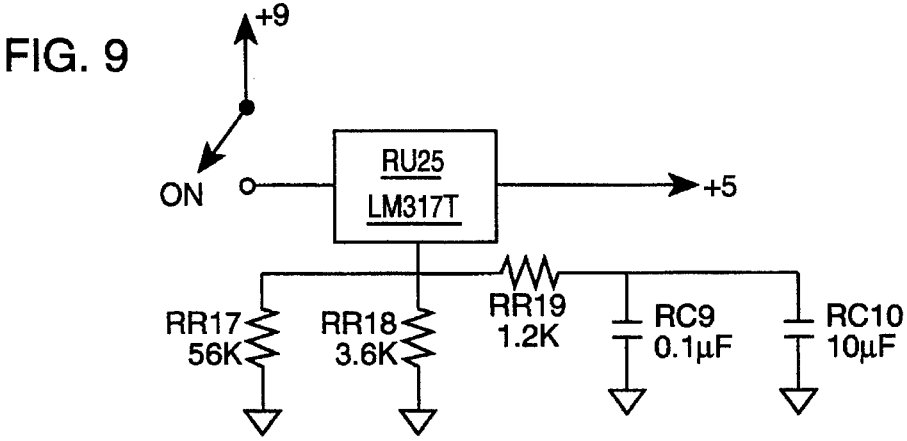
FIG. 9

5,499,199

DISTANCE MEASURING SYSTEM

BACKGROUND OF THE INVENTION

1. Technical Field

The present invention generally relates to a distance measuring system and, more particularly, to a distance measuring system utilizing the propagation of radio frequency (RF) signals between remotely located RF communication units, even if non-line-of-sight measurements are required.

2. Description of the Related Art

There are many applications in which it is desirable to know a distance between two points. For example, an operator of a boat may desire to know the distance between the boat and an underwater obstacle as marked by a buoy. A surveyor makes a series of distance measurements to mark out a property line. A golfer may desire to know the distance remaining to the green or to some hazard on the hole being played. In the case of the golfer, this information may be obtained by reference to yardage markers on the golf course or by reference to so-called yardage books which provide the distances based on the distance from particular trees, sand traps, or other marker. However, since distance measurements to a green are generally relative to the center of the green, the distance may not be accurate for a particular pin placement on a given day. Also, if a player's ball is displaced from one of the markers, it is necessary to estimate the distance from the ball to the marker, thereby introducing further error into the distance determination. In addition, yardage markers and yardage books frequently fail to provide meaningful indications of the distance to a particular hazard.

U.S. Pat. No. 4,751,689 to Kobayashi discloses a method of measuring a distance on a golf course by determining a time difference between a radio-wave and a sonic-wave from a measuring point to a point to be measured followed by the multiplication of the time difference with the sonic velocity.

U.S. Pat. No. 4,136,394 to Jones includes a remote unit which emits a radio frequency pulse toward a base unit at the pin. The base unit upon receiving the pulse from the remote unit emits an acoustic signal toward the remote unit. Upon receipt of the ultrasonic signal, the remote unit measures the time interval between the sending of the RF pulse and receipt of the ultrasonic signal. From this time interval, the remote unit determines the distance between the remote unit and the base unit based on the speed of the ultrasonic signal through the air.

Such systems, however, suffer from several deficiencies. For example, the speed of sound varies in accordance with environmental factors such as temperature and humidity, thereby introducing uncertainties into the distance measurement. In addition, the operation of such systems can be degraded if objects are located between the points whose separation is to be measured.

SUMMARY OF THE INVENTION

It is an object of the present invention to provide a distance measuring system in which the propagation time of an RF signal is used to determine distance.

It is a further object of the invention to provide a distance measuring system which is capable of providing a distance measurement between first and second radio units regardless of whether the first radio unit is within the line-of-sight of the second radio unit.

It is a further object of the invention to provide a distance measuring system that determines the distance between two points on the basis of a plurality of measurements of the propagation of RF signals.

In accordance with the present invention, a distance measuring system includes a first radio unit located at a first location and a second radio unit located at a second location. The first radio unit includes a receiver for receiving an RF query signal from the second radio unit and a transmitter responsive to the RF query signal for transmitting an RF answer signal to the second radio unit. The second radio unit includes a transmitter for transmitting the RF query signal to the first radio unit and a receiver for receiving the RF answer signal from the first radio unit. Counting circuitry counts during a time beginning when the RF query signal is transmitted and ending when the RF answer signal is received so as to generate a count which is the distance between the first radio unit and the second radio unit. A display coupled to the counting circuitry displays the count.

Thus, the distance can be calculated by measuring the time between specific signal events. Furthermore, through careful selection of the units by which the propagation time is measured, the actual distance travelled by the signal can be displayed directly. This aspect of the invention will be discussed in more detail below. Alternatively, the propagation time can be measured in conventional units of time, e.g., seconds, and then converted into distance.

BRIEF DESCRIPTION OF THE DRAWINGS

These and other objects, features and advantages of the present invention will be better understood from a reading of the following detailed description in conjunction with the accompanying drawings in which:

FIGS. 8A–8L are schematic diagrams of the remote unit according to a preferred embodiment.

FIG. 9 is a schematic diagram of a power supply circuit for use with the remote unit.

DETAILED DESCRIPTION OF THE PREFERRED EMBODIMENTS

With reference to the accompanying figures, the distance measuring system of the present invention includes a remote communication unit and a base communication unit.

Figure 1:
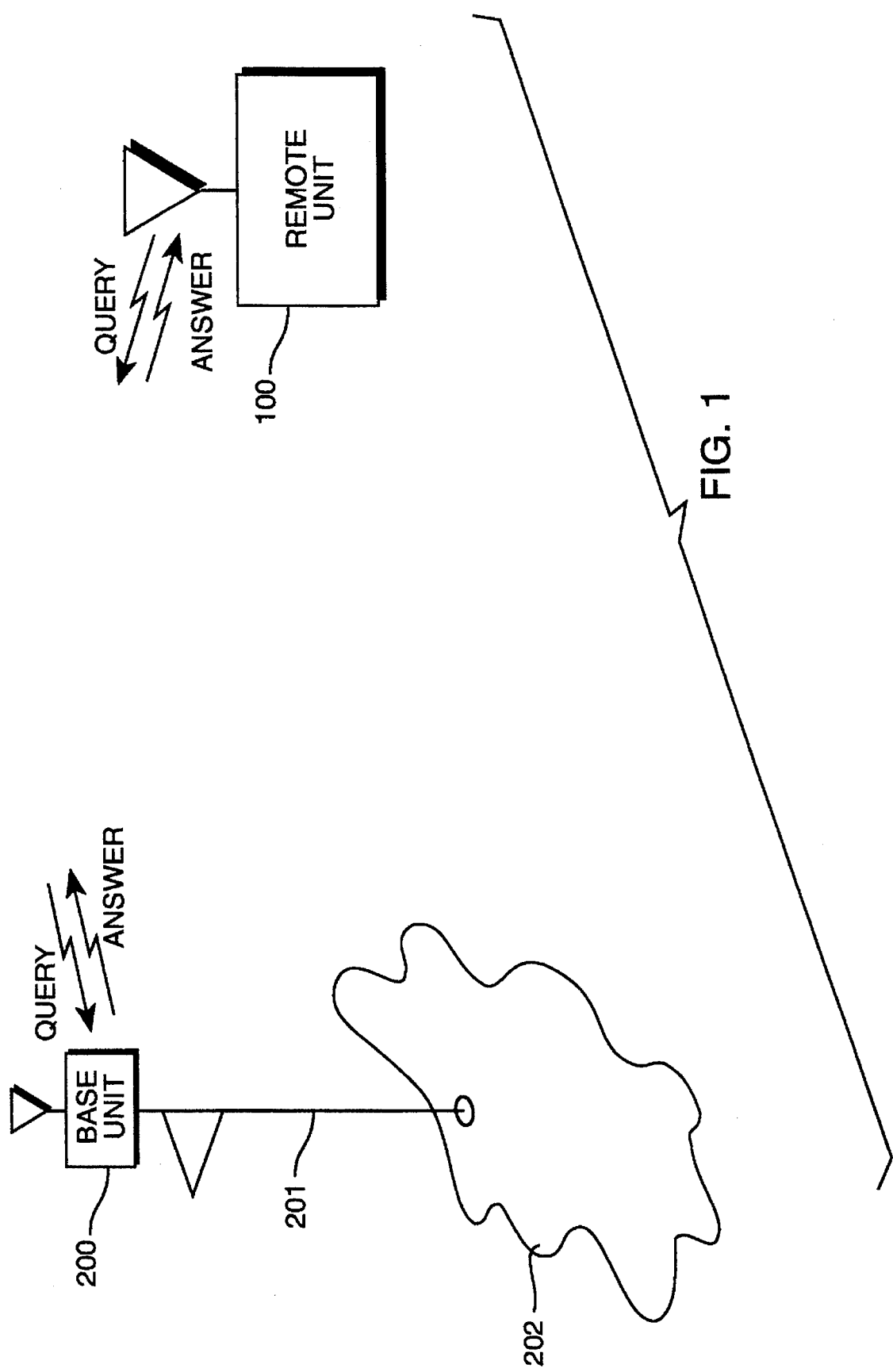
FIG. 1 is a block diagram illustrating an embodiment of the distance measuring system in accordance with the present invention adapted for use on a golf course.

According to one illustrative, but nonetheless nonlimiting, embodiment of the present invention illustrated in FIG. 1, a base unit 200 may be coupled to a pin 201 on a green 202 of a golf course and a remote unit 100 may be carried by a golfer. A query signal is transmitted from remote unit 100 to base unit 200 and an answer signal is transmitted from base unit 200 to remote unit 100. The adjectives "base" and "remote" should not be understood to limit the present invention. In general, the present invention provides a method and apparatus for measuring the distance between first and second communication units at first and second different locations. Therefore, the base unit 200 need not necessarily be secured at a fixed location.

The principle of operation of the present invention is based upon the fact that the time for query and answer signals to propagate between the first and second communication units increases with increasing distance between the communication units. That is, the time for signals to propagate between the communication units is directly proportional to the distance travelled. Remote unit 100 generates a measure of the time between the transmission of the query pulse to base unit 200 and the reception of the answer pulse from base unit 200 using circuitry including digital counters. As discussed in greater detail below, in order to enhance the accuracy of the distance measurement, a plurality of query/answer signal pairs are utilized. For example, in a system adapted for measuring distances in a range to be encountered by a golfer on a golf course, a total of 10,000 query/answer signal pairs may be utilized. Since a query signal may transmitted from remote unit 100 approximately every 30 microseconds, the total time for a distance measurement using 10,000 query/answer signal pairs is approximately 0.3 seconds. In other words, each query/answer cycle can be completed within 30 microseconds given the distances likely to be encountered by a golfer on a golf course. As discussed in greater detail below, in a preferred embodiment, the units for measuring propagation time and the number of query pulse/answer pulse pairs are chosen to permit the distance between the first and second communication units to be displayed directly without requiring any complicated and/or expensive circuitry for performing mathematical calculations.

Figure 2:
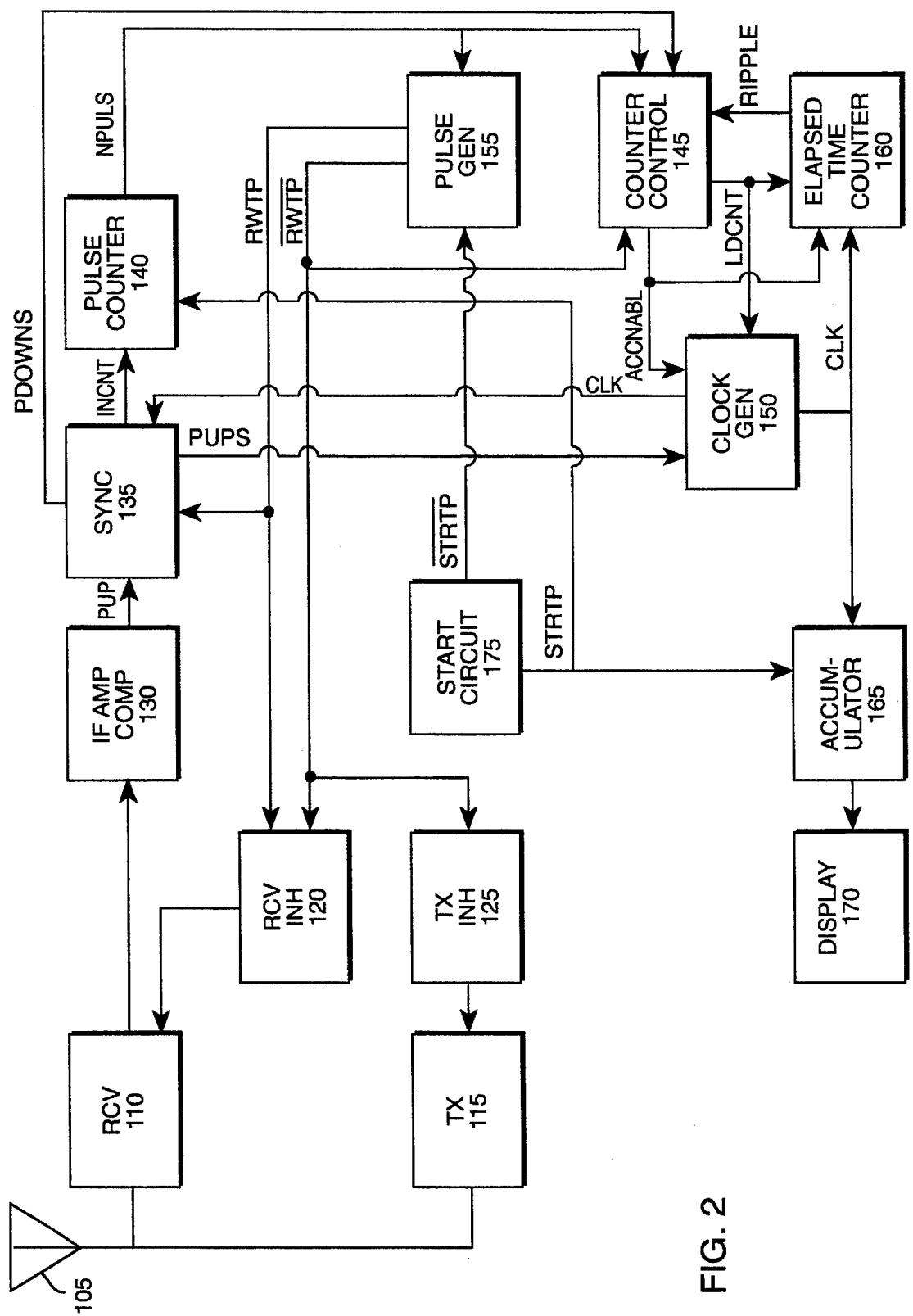
FIG. 2 is a block diagram of the remote unit illustrated in FIG. 1.

FIG. 2 is a block diagram of remote unit 100 illustrated in FIG. 1. Remote unit 100 includes an antenna 105, a receiver 110 for receiving answer signals from base unit 200, and a transmitter 115 for transmitting query signals to base unit 200. A receiver inhibit circuit 120 and a transmitter inhibit circuit 125 selectively inhibit receiver 110 and transmitter 115, respectively. IF amplifier/comparator circuit 130 outputs signals to synchronization circuit 135 in response to answer signals received by receiver 110. Synchronization circuit 135 generates signals which are supplied to a pulse counting circuit 140, a counter control circuit 145 and a clock generating circuit 150. Pulse counting circuit 140 counts the number of answer pulses received by receiver 110. A pulse generating circuit 155 generates a pulse which is supplied to transmitter 115 for transmission to base unit 200 via antenna 105. Clock generating circuit 150 generates clock signals for use by elapsed time counter 160 and accumulator 165. Elapsed time counter 160 generates a count representing a time interval from when a query signal is transmitted until a corresponding answer signal is received. Accumulator 165 accumulates a sum of the elapsed times for a plurality of query/answer signal pairs. Display 170 displays the sum in accumulator 165. Start circuit 175 initiates operation of the distance measuring system.

Figure 3:
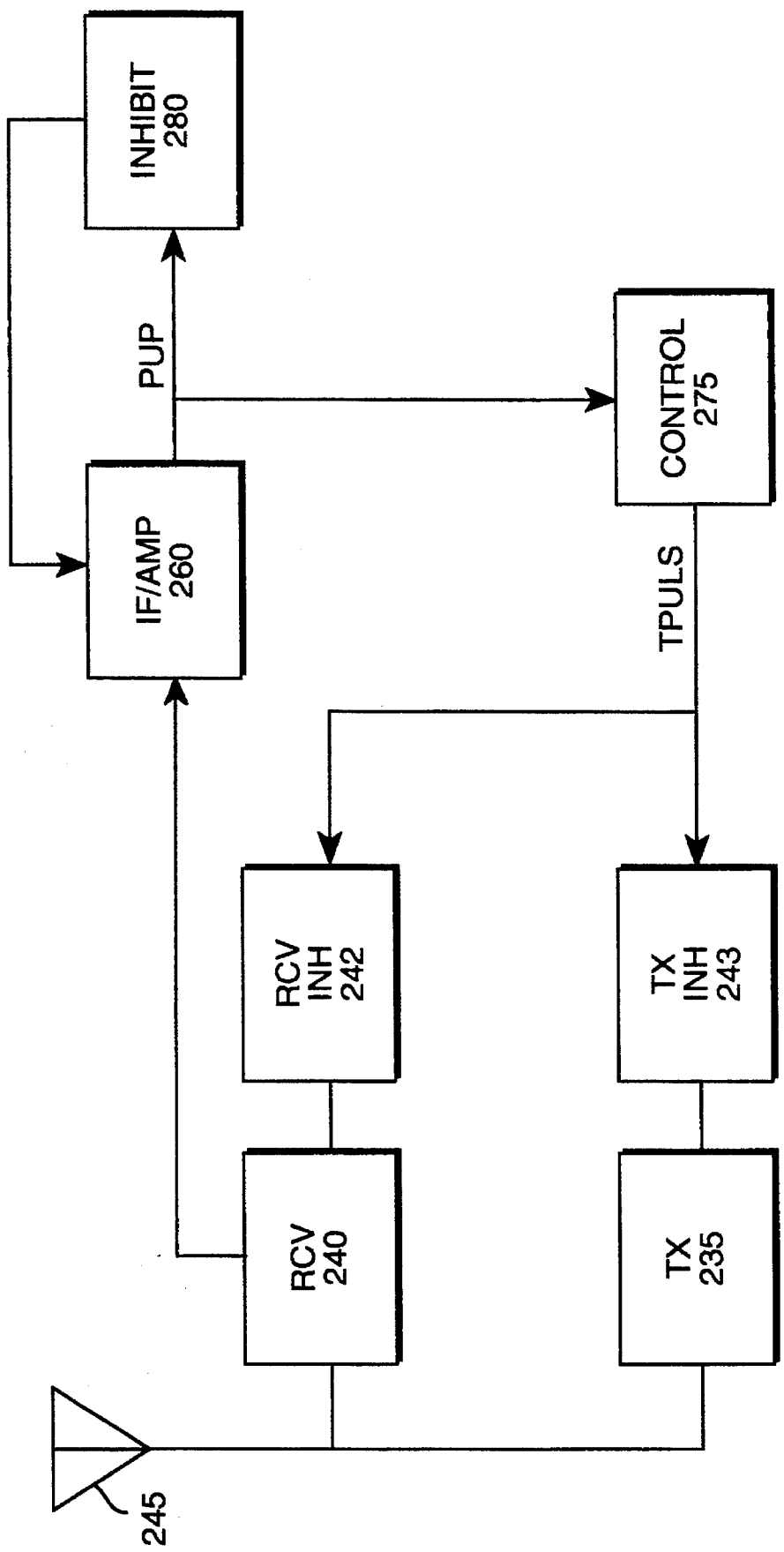
FIG. 3 is a block diagram of the base unit illustrated in FIG. 1.

FIG. 3 is a block diagram of base unit 200 illustrated in FIG. 1. Base unit 200 includes a receiver 240 coupled to an antenna 245 for receiving query signals transmitted from remote unit 100. Receiver 240 has an output coupled to an IF amplifier/comparator circuit 260. IF amplifier/comparator circuit 260 has an output coupled to a control circuit 275 and an inhibit circuit 280. Inhibit circuit 280 has an output coupled to IF amplifier/comparator circuit 260. Control circuit 275 has an output coupled to receiver inhibit circuit 242 and to a transmitter inhibit circuit 243. Receiver inhibit circuit 242 and transmitter inhibit circuit 243 selectively inhibit receiver 240 and transmitter 235, respectively. Transmitter 235 transmits an answer pulse to remote unit 100 via antenna 245.

Figure 4:
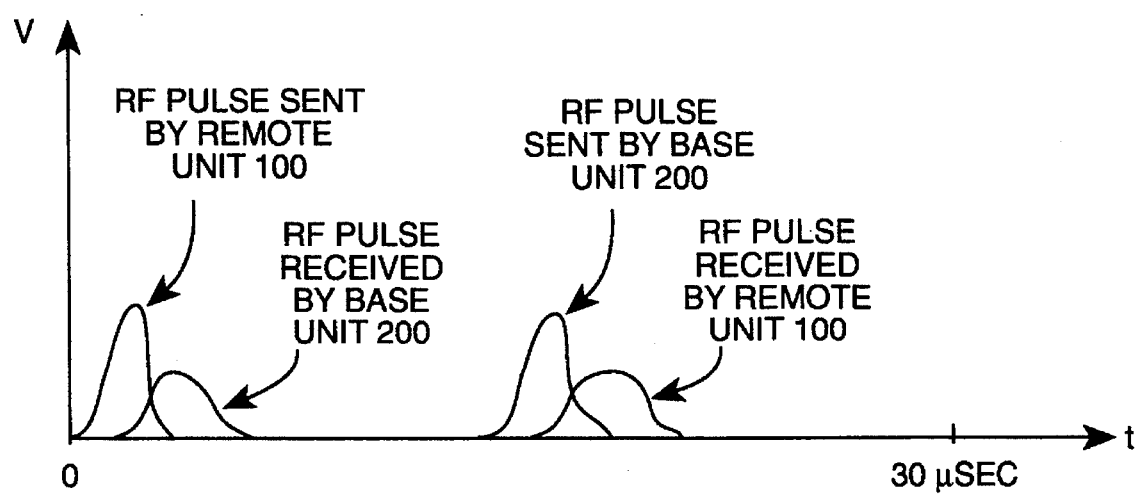
FIG. 4 is a timing diagram illustrating the transmission and reception of RF pulses between the remote unit and the base unit during a single measurement cycle.

As is clear from the above description, the present invention uses RF pulses transmitted and received between the remote unit 100 and the base unit 200. However, certain problems arise in implementing such a system. With a speed of about 328 * 10E6 yards/sec, the time to traverse the nominal distance of 180 yards between the remote unit 100 and the base unit 200 is only 0.5 microseconds. FIG. 4 illustrates an ideal time chart of the RF pulse transmission and reception between the remote unit 100 and the base unit 200. As can be seen in FIG. 4, the rise time of the pulses are close to the time displacements between the transmitted and received pulses to be measured. As a result, changes in the shape of the leading edge of the received pulse (caused by noise, for example) will cause large errors in the measurement.

Figure 5A:
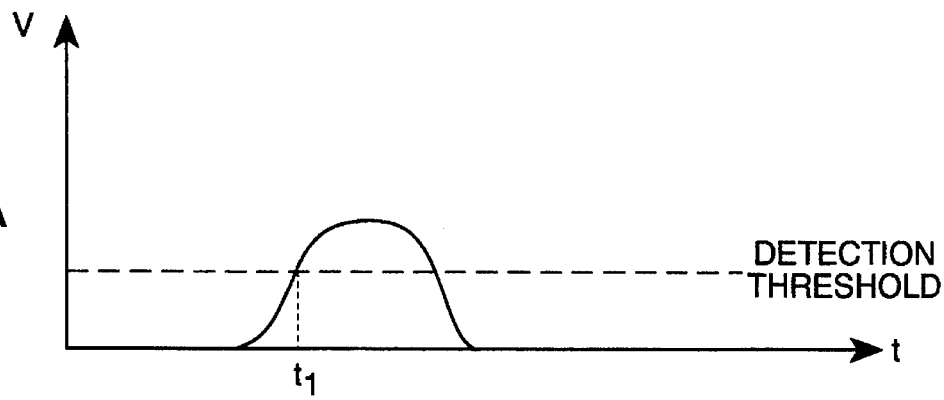
FIGS. 5A–5D are timing diagrams illustrating the measurement of the arrival of a received pulse.
Figure 5B:
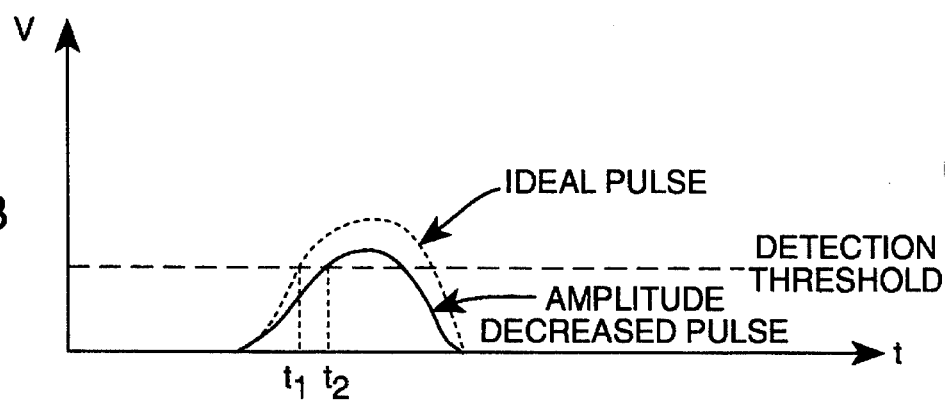

To further illustrate this problem, reference is made to FIGS. 5A–D. FIG. 5A depicts the arrival of the ideal received pulse at $t_1$, when the amplitude of the received pulse exceeds the detection threshold. In FIG. 5B, the received pulse has only ⅔ of the ideal pulse amplitude. This reduction in amplitude of the received pulse may be attributable to system noise or an increased propagation distance. Consequently, the received pulse appears to arrive at $t_2$. The difference between $t_1$ and $t_2$ is large compared to the 0.5 microsecond times that are measured.

Figure 5C:
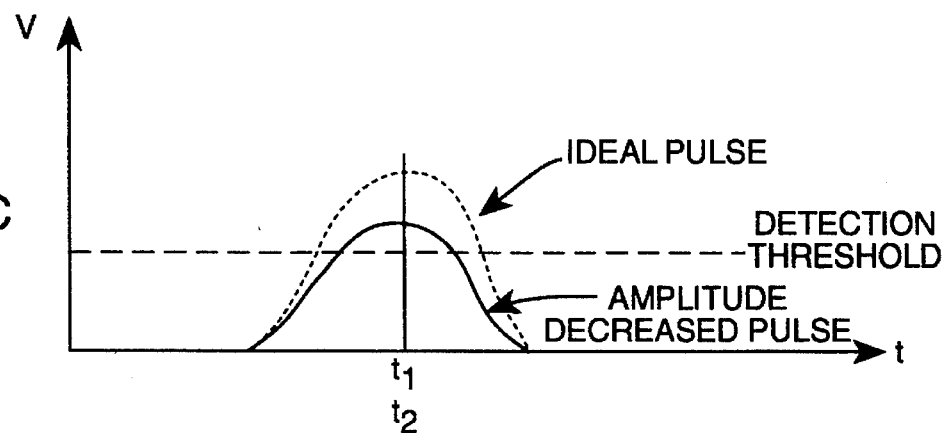

To overcome this amplitude instability problem, the present invention does not measure the arrival of the received pulse at its leading edge. Rather, the arrival of the received pulse is determined from the center of the received pulse, as illustrated in FIG. 5C. This removes the amplitude stability problem as long as the received pulses are made to be symmetrical. This may be achieved by counting time at a half rate during the time the received pulse amplitude exceeds the detection threshold. Thus, when the pulse amplitude falls below the detection threshold, the time is the actual time to the center of the pulse. Circuitry for accomplishing this result is described in detail below.

Figure 5D:
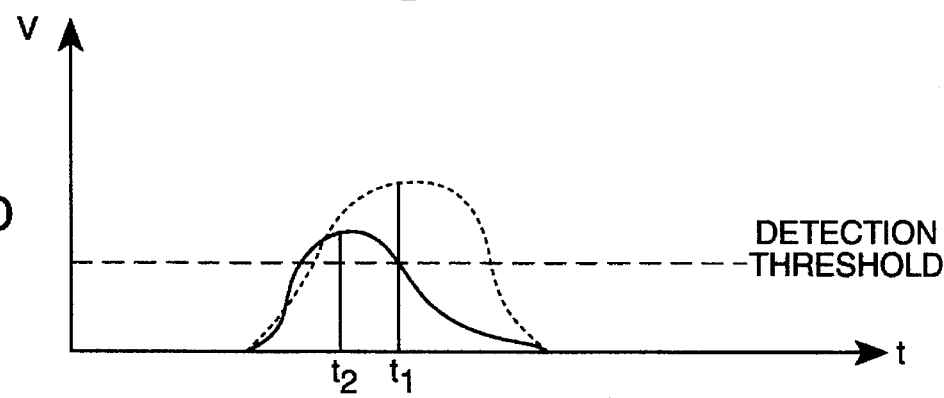

There is a second kind of noise that may be introduced into the system. As illustrated in FIG. 5D, this noise may distort the shape of the received pulse. This jitter noise may cause distortion of the ideal waveform either to the right or to the left. As a result, the arrival time of the received pulse shown in FIG. 5D would be measured at $t_2$ rather than at $t_1$ as would be the case if the received pulse were ideal. As above, the difference between $t_1$ and $t_2$ is significant compared to the times measured. However, the average contribution of the jitter noise for an infinite number of measurement cycles is zero. In other words, the jitter adds time to $t_1$ as often as it subtracts time from $t_1$. If 10,000 to 100,000 measurement cycles are averaged, the error attributable to jitter noise reduces to acceptable levels.

Figure 6:
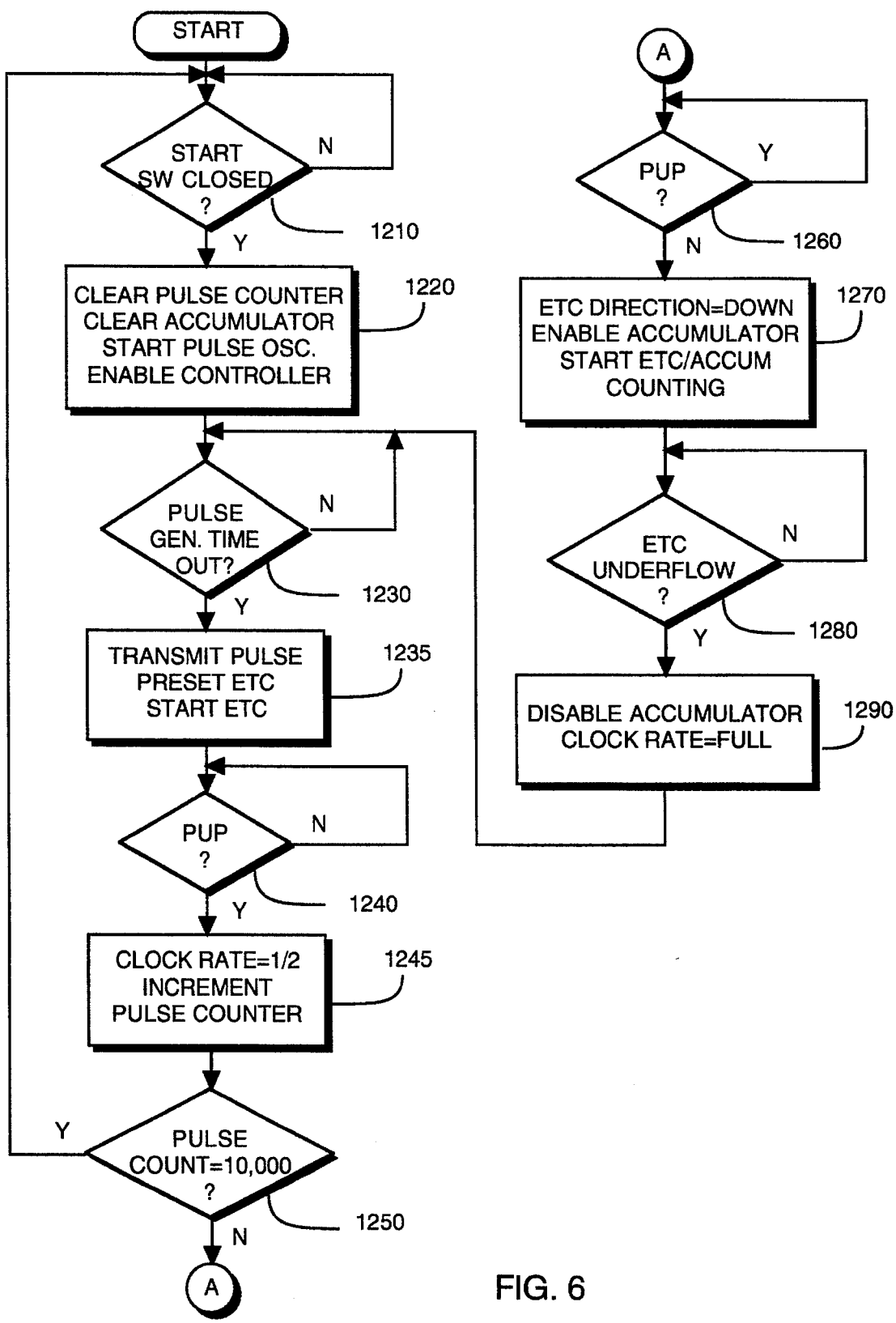
FIG. 6 is a flow chart illustrating the operation of the remote unit depicted in FIGS. 2 and 8A–8L.
Figure 7:
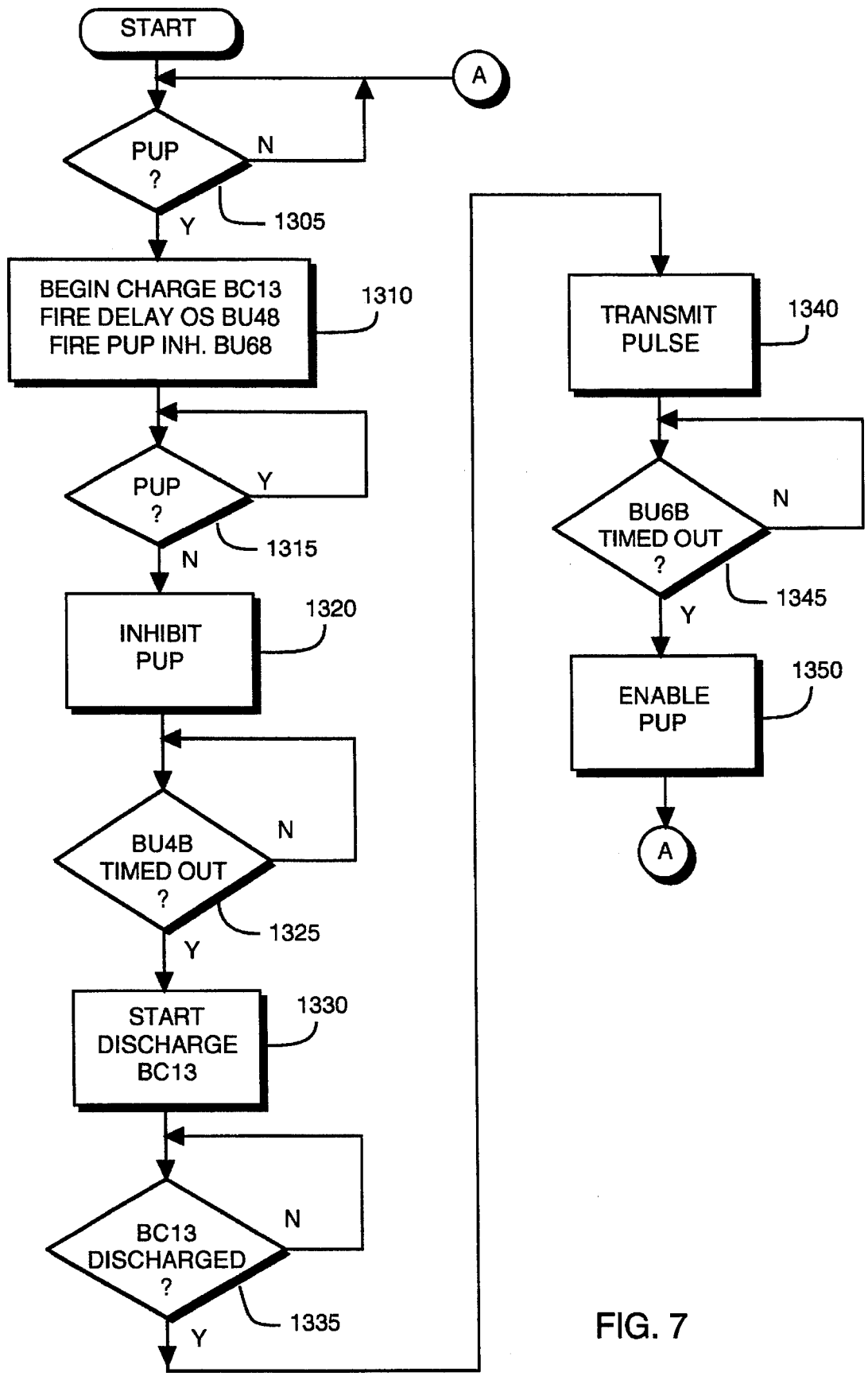
FIG. 7 is a flow chart illustrating the operation of the base unit depicted in FIGS. 3 and 10A–10E.

The operation of the distance measuring system in accordance with the invention will be explained with reference to FIGS. 2 and 3 and the flow charts of FIGS. 6 and 7.

In response to an actuation of a start switch of start circuit 175 (step 1210), a signal STRTP clears pulse counter 140 and accumulator 165 (step 1220). Pulse counter 140 generates a signal NPULS which enables pulse generator 155 (step 1220). The signal NPULS also enables counter control circuit 145. At the end of the signal STRTP, pulse generator 155 generates an oscillation signal RWTP having a period, for example, of about 30 microseconds (step 1220). Of course, the period of the oscillation signal may be varied, for example, depending on the range of distances to measured. The RWTP pulse is supplied to transmitter inhibit circuit 125, thereby enabling transmitter 115 to transmit an RF query pulse signal having a frequency of, for example, 49.89 megahertz, to base unit 200 via antenna 105 (step 1235). The RWTP pulse is supplied to receiver inhibit circuit 120 for inhibiting receiver 110 during transmission of the query pulse in order to protect the receiver from receiving false detections of RF answer signals due to the transmission of the query pulse from transmitter 115. The end of the RWTP pulse causes a load count pulse LDCNT to be generated by counter control circuit 145. This short LDCNT pulse causes a preset value to be loaded into elapsed time counter 160 (step 1235). This preset value is selected to compensate for fixed delays in base unit 200 and remote unit 100. At the end of the LDCNT pulse, elapsed time counter 160 begins counting in a first direction (e.g., up) from the preset value in accordance with a clock signal CLK generated by clock generating circuit 150 (step 1235). As will be discussed in greater detail below, the clock signal CLK preferably has a frequency of 16.257 megahertz in order that the distance between remote unit 100 and base unit 200 may be displayed directly without requiring any circuitry for performing complicated mathematical calculations.

Figure 10A:
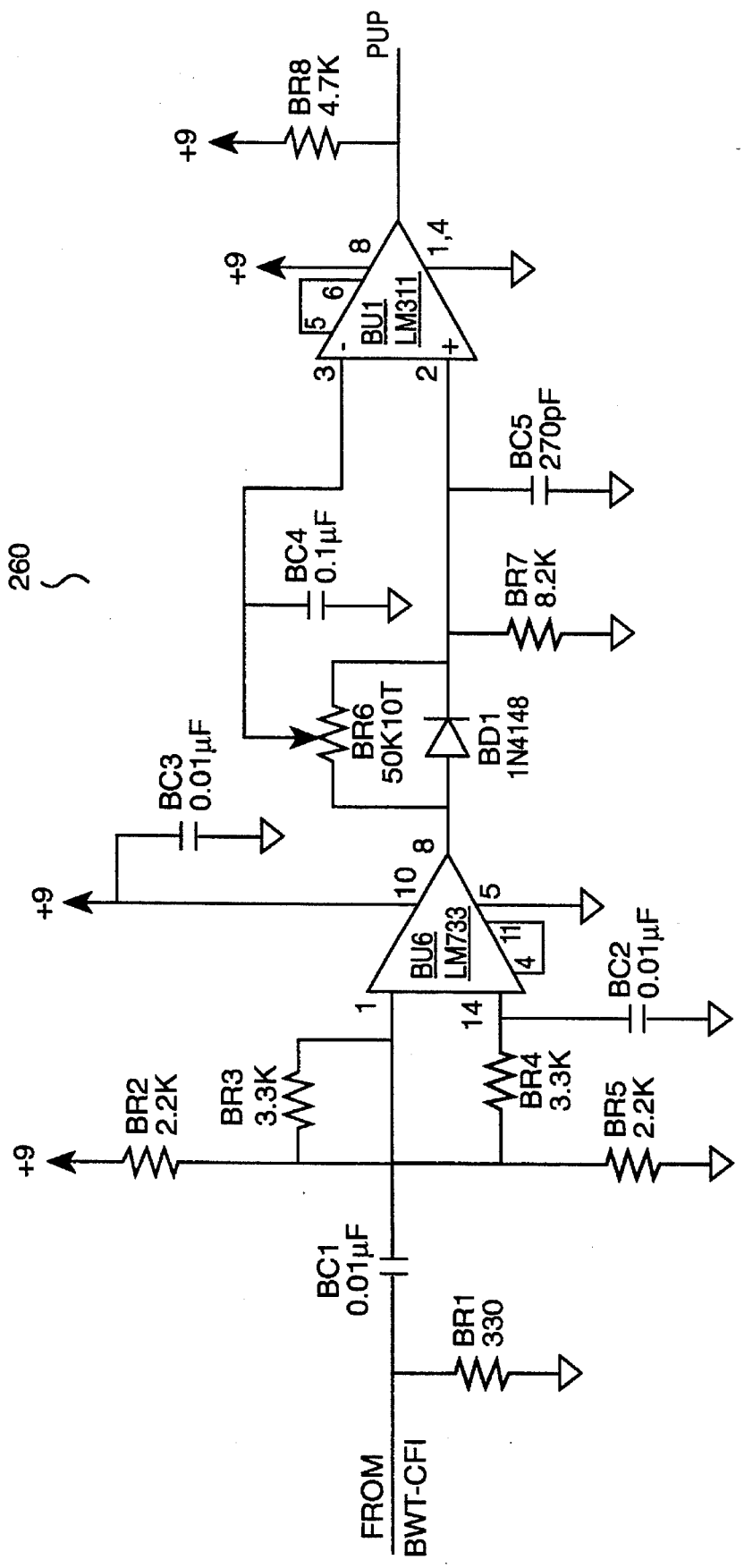
FIGS. 10A–10E are schematic diagrams of the base unit according to a preferred embodiment.

The query pulse is received and detected by receiver 240 of base unit 200 via antenna 245. IF amplifier/comparator circuit 260 asserts a signal PUP for the duration of the received query pulse (step 1305). In order to prevent false pulse detections due to RF pulses transmitted by the base unit 100, the signal PUP is inhibited from its trailing edge until just before a subsequent legitimate pulse detection can occur using the inhibiting circuit 280. Thus, inhibit circuit 280 includes a timing circuit for timing a predetermined period and circuitry for holding PUP low during the predetermined time period. FIG. 10C is a schematic diagram of inhibit circuit 280 and reference should be made thereto for this discussion of the operation of base unit 200. The leading edge of PUP fires BU6B, which provides detection inhibit timing (step 1310). On the trailing edge of PUP (step 1315), the collector of inverter BQ5 goes high, setting flip-flop BU5B, which in turn saturates transistor BQ6, holding PUP low (step 1320).

Figure 10B:
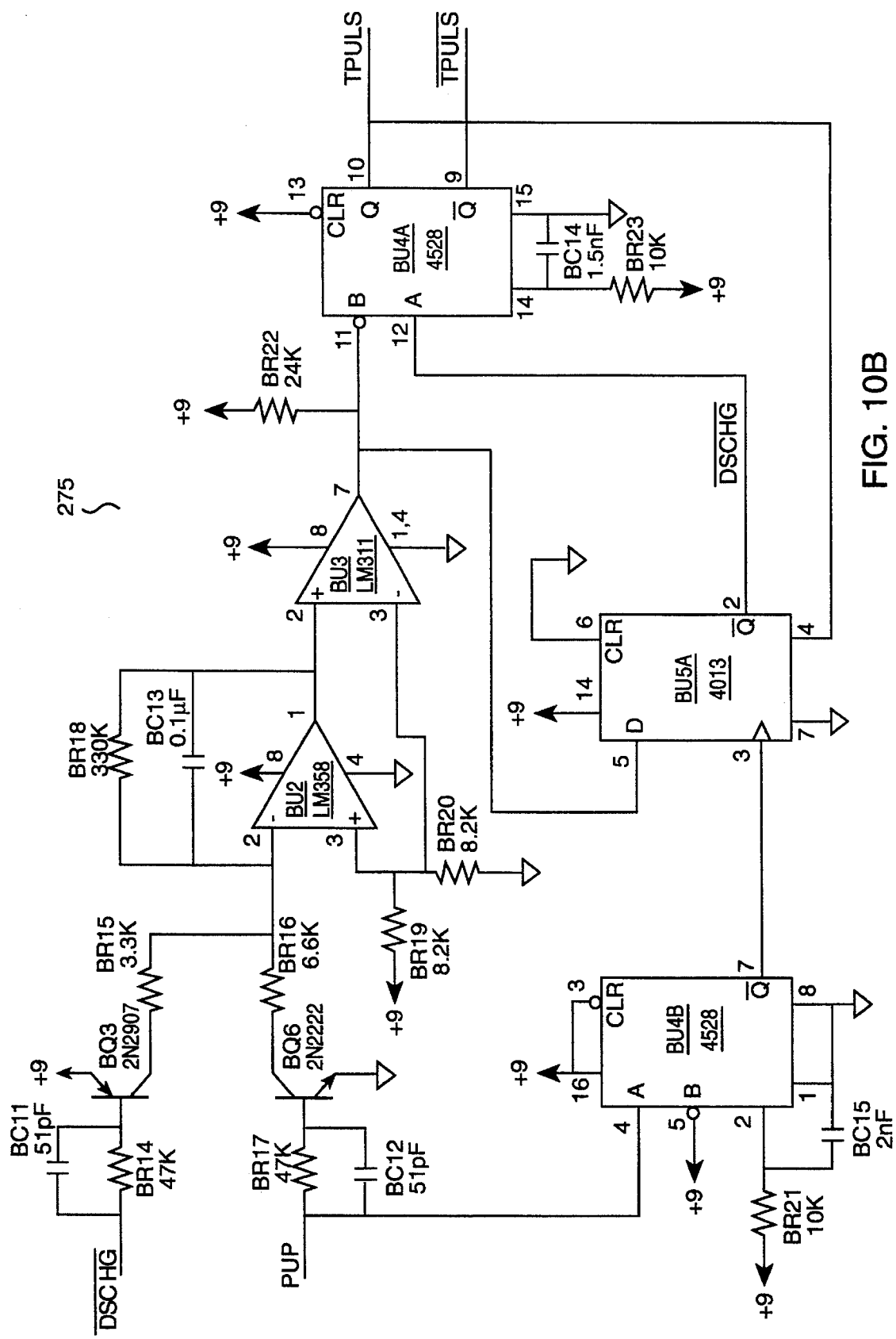
Figure 10C:
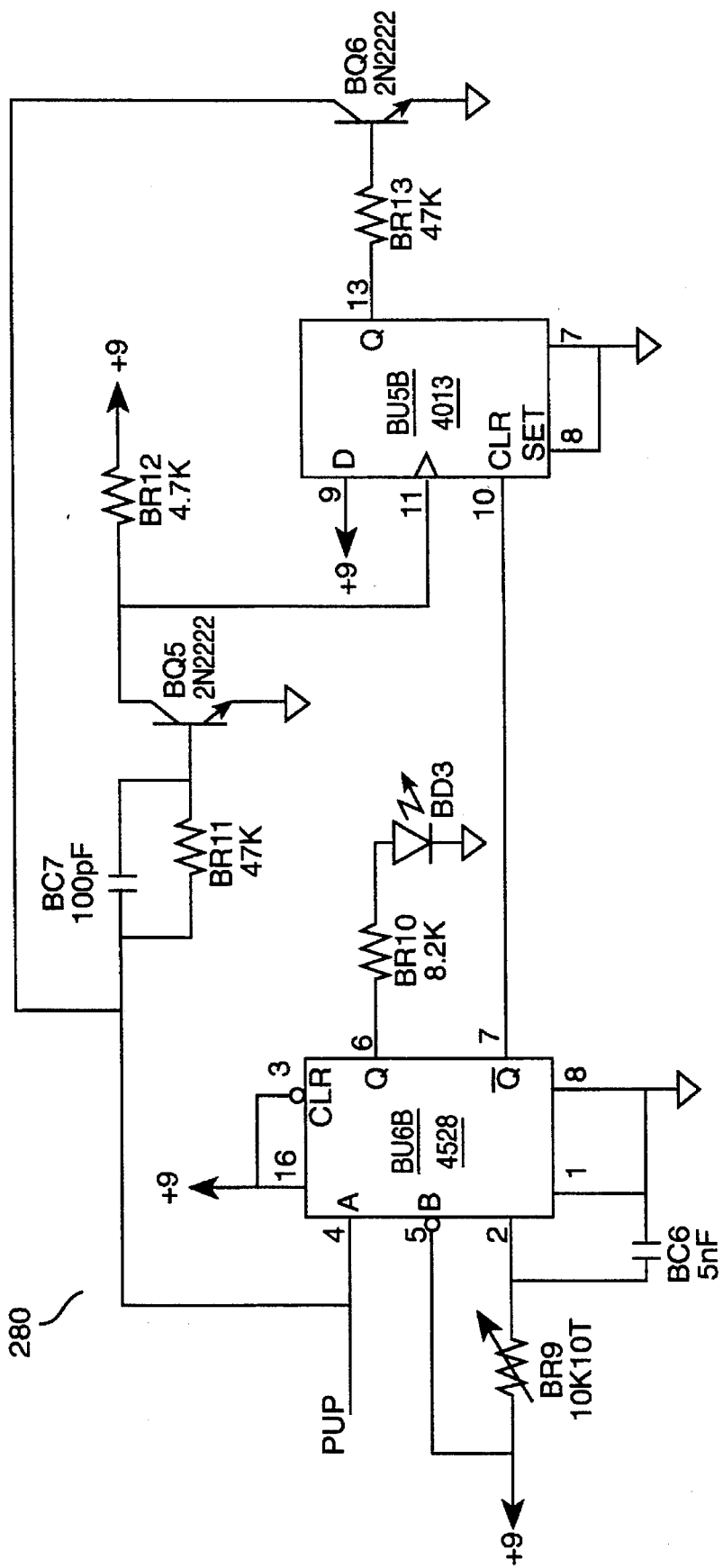

The leading edge of PUP also fires one-shot BU4B, depicted in FIG. 10B (step 1310). Whenever one-shot BU4B times out (step 1325), flip-flop BU5A is set, causing a discharge signal DSCHG to go high. The signal DSCHG saturates transistor BQ3, which in turn causes BC13 to discharge (step 1330) and causes the output of BU2 to discharge toward the voltage at BU2-3. However, because the value of BR15 is one-half the value of BR16, the discharge rate is twice as fast as the charge rate, so that the discharge is complete, and the output of BU3 goes low, in one-half the time taken for the charge cycle, or one-half the duration of PUP. Whenever BU3-7 goes low, BU4A fires and creates a transmit pulse TPULS of approximately five microseconds duration, for example (step 1340). This pulse occurs at a fixed delay plus one-half the duration of PUP after the occurrence of PUP, and thus is effectively timed with the middle of PUP. Whenever BU6B times out (step 1345), BU5B is cleared, BQ6 is turned off, and PUP is re-enabled (step 1350). The signal TPULS is supplied to transmitter inhibit circuit, thereby enabling transmitter 235 to transmit an answer signal having a frequency, for example, of 46.83 megahertz (step 1340). The signal TPULS is also supplied to receiver inhibit circuit 242 which inhibits receiver 242, thereby preventing the false detection of a query pulse during transmission of the answer pulse.

The answer signal pulse from base unit 200 is received by receiver 110 via antenna 105. The answer signal pulse is supplied to IF amplifier/comparator circuit 130 which asserts a PUP signal for the duration of the received RF pulse (step 1240). The PUP signal is synchronized to the elapsed time counter clock signal CLK by synchronization circuit 135 in order to satisfy setup and hold time specifications for the counters in elapsed time counter 160. The signals INCNT, PUPS, and PDOWNS are generated by synchronization circuit 135. The signal INCNT from synchronization circuit 135 clocks pulse counter 140 to increment the count of the counter (step 1245). The signal PUPS is supplied to clock generating circuit 150 in order to change the frequency of clock signal CLK from 16.257 megahertz to 8.1285 megahertz (step 1245). Utilizing this half-rate clock during the received answer signal pulse results in an elapsed time measurement to the center of the received answer signal pulse, thereby making the measurement less sensitive to variations in the pulse rise and fall times, as discussed above. If the pulse count of pulse counting circuit 140 is not equal to some predetermined value (e.g., 10,000) (step 1250), the signal PDOWNS is supplied to counter control circuit 145 which causes the signal ACCNABL to be set. ACCNABL enables accumulator 165 and changes the count direction in the elapsed time counter 160 from the first direction to a second direction (e.g., down) (step 1270). Thus, elapsed time counter 160 counts down at the same time as accumulator 165 counts up (step 1270). When elapsed time counter 160 underflows (step 1280), a RIPPLE signal is supplied to counter control circuit 145. The RIPPLE signal causes the signal ACCNABL to be cleared, thereby disabling accumulator 165 which stops counting up, and changes the clock rate back to 16.257 megahertz (step 1290).

It is noted that an answer pulse may not be received by remote unit 100. This may be due to a number of reasons such as signal interference. In this instance, no PUP signal is asserted by IF amplifier/comparator circuit pulse counter 130 and no INCNT, PUPS, or PDOWNS signals are generated. Thus, pulse counter 140 is not clocked and the count of the pulse counter 140 is not incremented. Further, the count of elapsed time counter 160 is not added to the count of accumulator 165. Thus, when the next oscillation signal RTWP is generated, the count on the counter is cleared and loaded with the preset value as described above. Thus, the operation of an elapsed time counter and an accumulator as described above takes into account that an answer pulse may not be received for every query pulse. The period of the oscillation signal RWTP should be chosen to be greater than the time for signals to propagate between the remote unit and the base unit over the maximum distance for which the system of the invention is adapted to measure. For example, in an embodiment of the invention designed to measure distances to be encountered on a golf course, RTWP may have a period of 30 microseconds.

A second RTWP pulse is then generated and the above-described operation is repeated. The operation continues until a predetermined number of answer signal pulses have been received and detected by remote unit 100. In a preferred, but nonetheless nonlimiting, embodiment, the predetermined number is fixed to be 9999. In such an embodiment, pulse counter 140 may include four decade counters. When the fourth decade counter overflows (step 1250), the signal NPULS disables counter control circuit 145 and pulse generating circuit 155. Thus, all pulse generation and counting operation are stopped, and the count of accumulator 165 is displayed.

As noted above, the value in accumulator 165 is output to display 170 to display the distance between remote unit 100 and base unit 200 in yards. The display of the distance in yards results for the following reasons. The actual distance in yards between remote unit 100 and base unit 200 is:

Distance in yards = $1/2 * t_{avg} * c$

= $1/2 *((\text{total count}/n)/\text{count frequency})* c$ where $t_{avg}$ is average time, c is the speed of the RF pulse which is $327.84 * 10E6$ yds/sec., and n is the number of measurement cycles. The constant ½ is provided because the elapsed time includes the propagation time for the query pulse from the remote unit to the base unit and for the answer pulse from the base unit to the remote unit. If the count frequency is 16.257 megahertz (i.e., the clock rate) and if n=10,000, the distance in yards is approximately equal to:

(total count)/1000.

Therefore, the basic clock frequency of 16.257 megahertz provides a resolution of ten yards, so that the elapsed time counts are ten times smaller than those corresponding to the actual distance. By dividing the 10,000 accumulated elapsed times by 1000, the displayed value is the distance between the remote unit 100 and the base unit 200 in yards, as desired. Because the elapsed times are random due to electrical noise in the base unit and remote unit receivers, the least significant displayed digit is not constant, and in fact provides an effective resolution of less than ten yards.

As will be discussed in detail below, accumulator 165 includes four counting circuits, each counting circuit including two decade counters. The clock signal CLK is connected to the second decade counter of the first counting circuit. Thus, for every ten (10) CLK pulses, one pulse is output from the second decade counter of the first counting circuit. Thus, a division by ten is accomplished. Similarly, the signal from the second decade counter of the first counting circuit is fed through the two decade counters of the second counting circuit. Therefore, for every one thousand clock pulses, one pulse is output from the second counting circuit. By averaging the measurements over n measurement cycles (e.g. 10,000), the standard deviation of the error due to random noise is reduced by a factor of $\sqrt{n}$. Accordingly, the accuracy of the distance measured (or count) that is ultimately displayed is improved.

Base unit 200 and remote unit 100 may be embodied by a pair of portable radio communication units. The portable radio communication units may be provided, for example, by modifying REALISTIC model TRC-503 walkie-talkies. REALISTIC is a registered trademark of the Tandy Corporation. The REALISTIC model TRC-503 walkie-talkie is described in REALISTIC Service Manual for the TRC-503 (Part Number MS-2100402), which is incorporated herein by reference. To produce communication units suitable for the present invention, all audio modulation and demodulation circuitry in the TRC-503 is disconnected, and the transmitter and receiver sections are enabled and disabled on a pulse-by-pulse basis as necessary for pulse generation and reception. In addition, the matching networks of the TRC-503 at base unit 200 and the TRC-503 at remote unit 100 may be removed to allow matching to more effective quarter-wavelength antennas in place of the short telescoping antennas standard with a TRC-503.

FIGS. 8A–8L and 10A–10E are schematic diagrams of the blocks of remote unit 100 and base unit 200 depicted in FIGS. 2 and 3, respectively. In addition, FIG. 9 is a power supply circuit that may be used with the circuitry depicted in FIGS. 8A–8L. Each of the devices in these figures is preferably low-power Schottky TTL. Thus, the full designator for RU1 in FIG. 8A, for example, is SN74LS221, RU2 in FIG. 8B is an SN74LS390, etc. The exceptions are RU7 which is preferably an SN74S74; RU18 which is preferably an SN74S02; and RU10, RU11, and RU12 which are preferably Fairchild "FAST" 190 up/down decade counters. The particular components identified above are illustrative, but nonetheless nonlimiting, components and the invention is not limited in this respect.

Figure 8A:
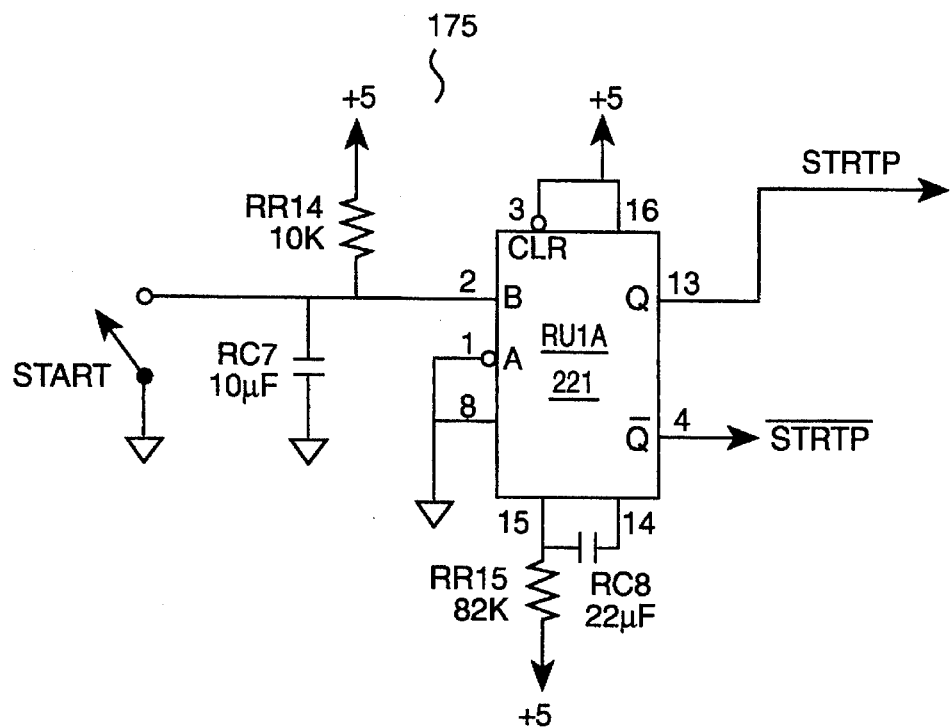

FIG. 8A is a schematic diagram of start circuit 175. The startup one-shot RU1A fires upon the closing of the start switch, such as a pushbutton, and generates the pulses STRTP and /STRTP.

FIG. 8B is a schematic diagram of pulse counting circuit 140 which includes first and second counting circuits RU2 and RU3. Counting circuits RU2 and RU3 each include two decade counters and thus pulse counter 140 counts from 0 to 9999. The signal STRTP clears counting circuits RU2 and RU3. The signal INCNT (supplied from synchronization circuit 165) increments pulse counter 140 by one for each answer pulse which is received. The pulse /STRTP clears RU4A of pulse counter 140. RU4A generates a signal NPULS which enables counter control circuit 145 and pulse generating circuit 155. When the pulse counter overflows, RU4A disables all pulse generation and counting.

Figure 8C:
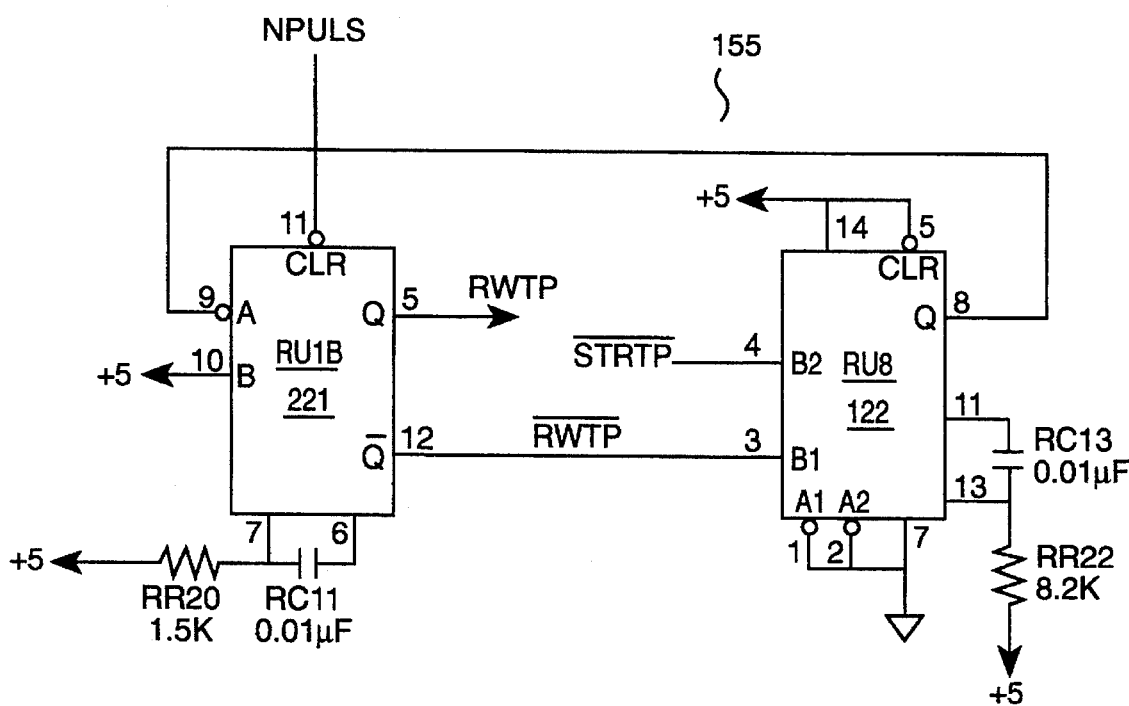
Figure 8B:
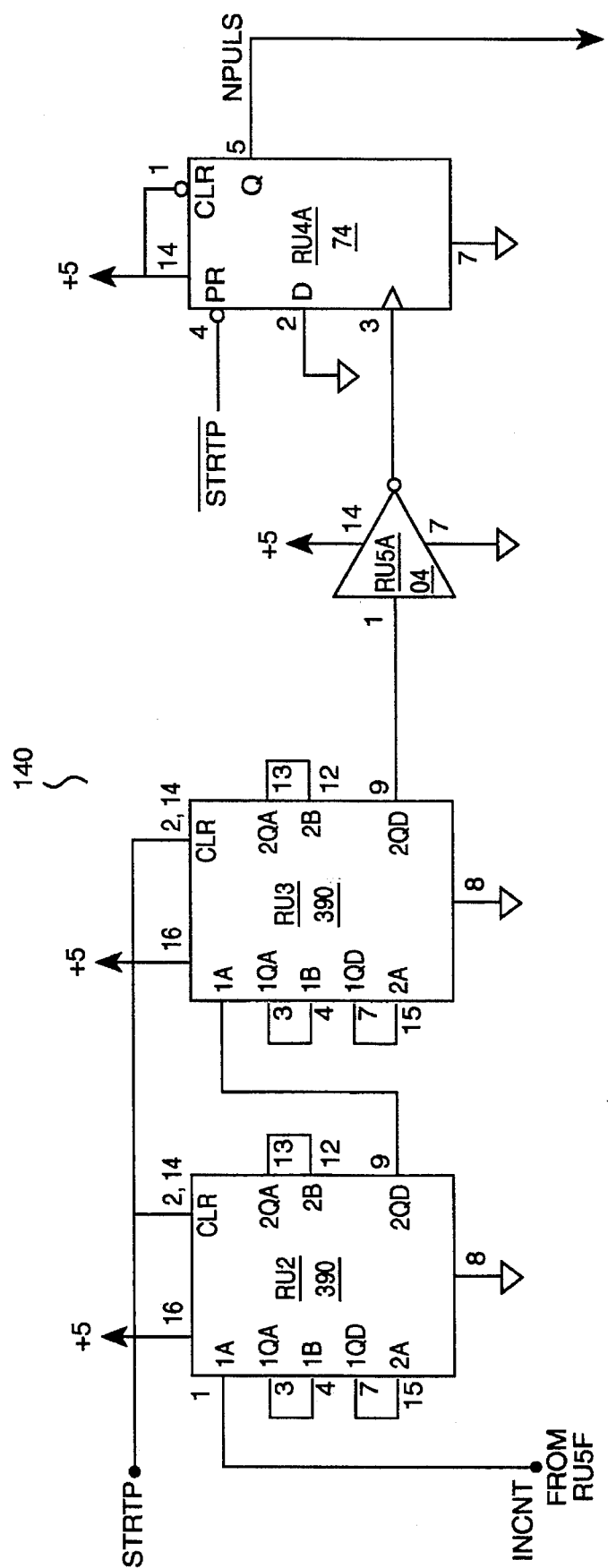

FIG. 8C is a schematic diagram of pulse generating circuit 155. Pulse generating circuit 155 includes a one-shot RU8 which fires at the end of /STRTP and initiates a sequence of query pulses. Query pulse generation is accomplished by cross coupling RU1B and RU8 shown in FIG. 8C to form an oscillator with a period of approximately 30 microseconds. The oscillator generates signal pulses RWTP and /RWTP.

Figure 8D:
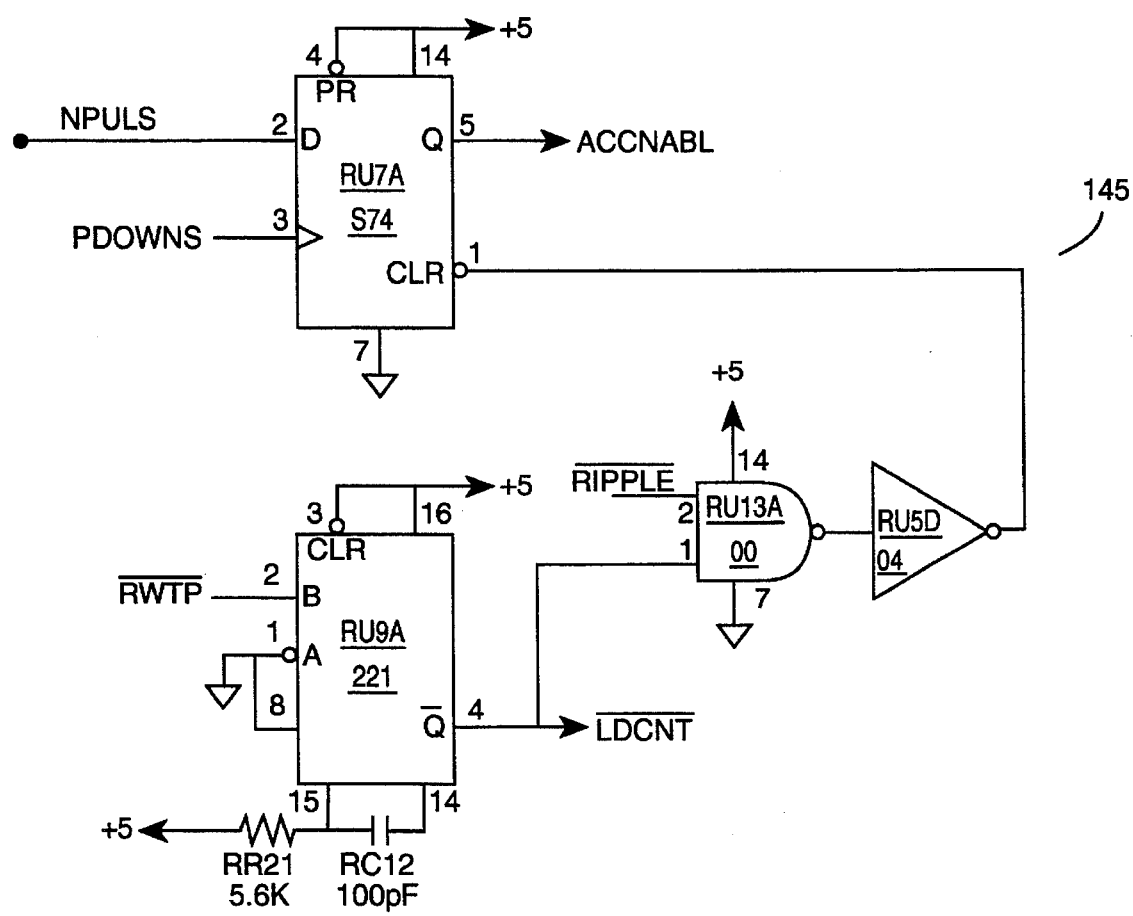

FIG. 8D is a schematic diagram of counter control circuit 145. /RWTP is applied to RU9A of counter control circuit 145. The end of the /RWTP pulse causes a load count pulse /LDCNT to be generated by RU9A. This short /LDCNT pulse causes a preset value to be loaded into elapsed time counter 160. As noted above, the preset value loaded into elapsed time counter 160 is adjusted to compensate for the fixed delays present in remote unit 100 and base unit 200. When /LDCNT goes false, elapsed time counter 160 begins counting up. Thus, elapsed time is measured from the end of the /RWTP pulse. The signal PDOWNS causes ACCNABL at the output of RU7A to be set. ACCNABL enables accumulator 165 and changes the count direction in elapsed time counter 160 from up to down. Elapsed time counter 160 and accumulator 165 count together until elapsed time counter 160 underflows, resulting in the /RIPPLE signal. The /RIPPLE signal clears ACCNABL through RU13A and RU5D. Accordingly, accumulator 165 is disabled.

Figure 8E:
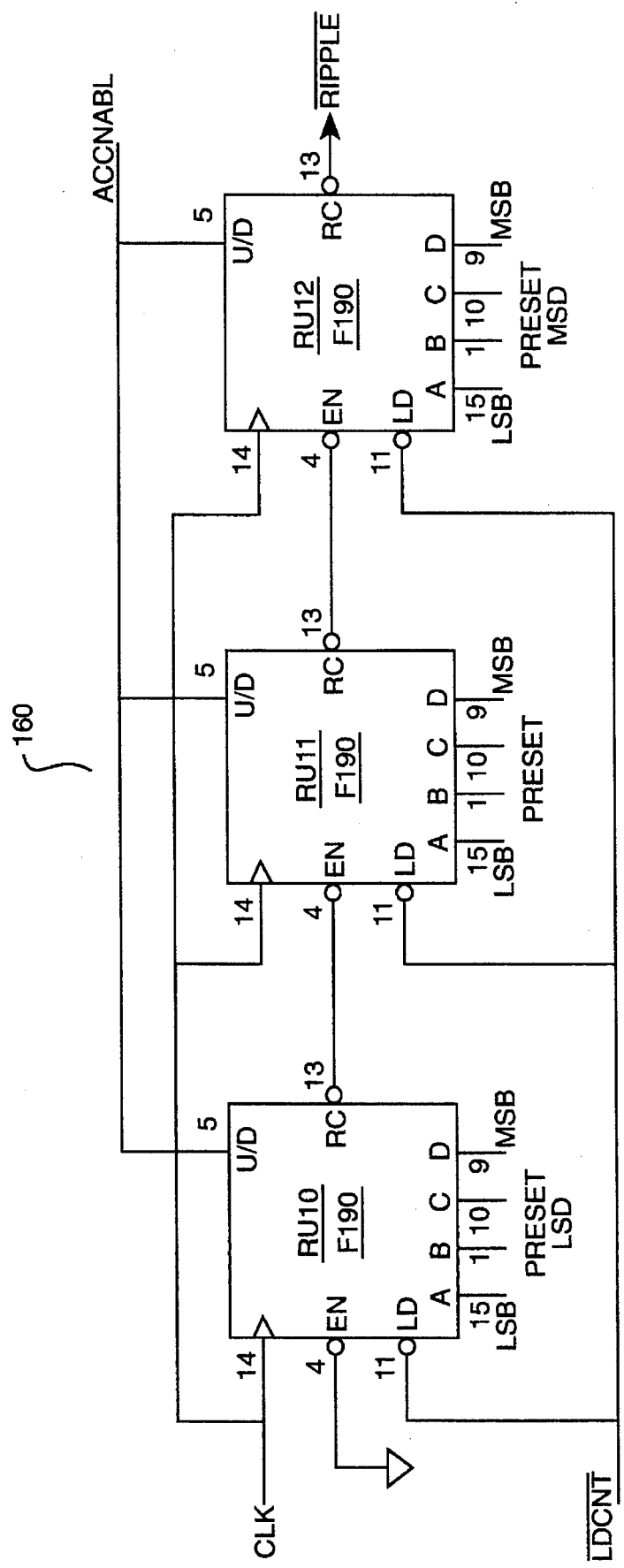

FIG. 8E is a schematic diagram of elapsed time counter 160. Elapsed time counter 160 includes three decade counters RU10, RU11, and RU12. Counters RU10, RU11, and RU12 each receive the /LDCNT signal for loading the preset value to compensate for the fixed delays, the clock signal CLK for clocking the counters, and the ACCNABL signal for controlling the direction of the counting, i.e., up or down. When elapsed time counter 160 underflows, the signal /RIPPLE is produced.

Figure 8F:
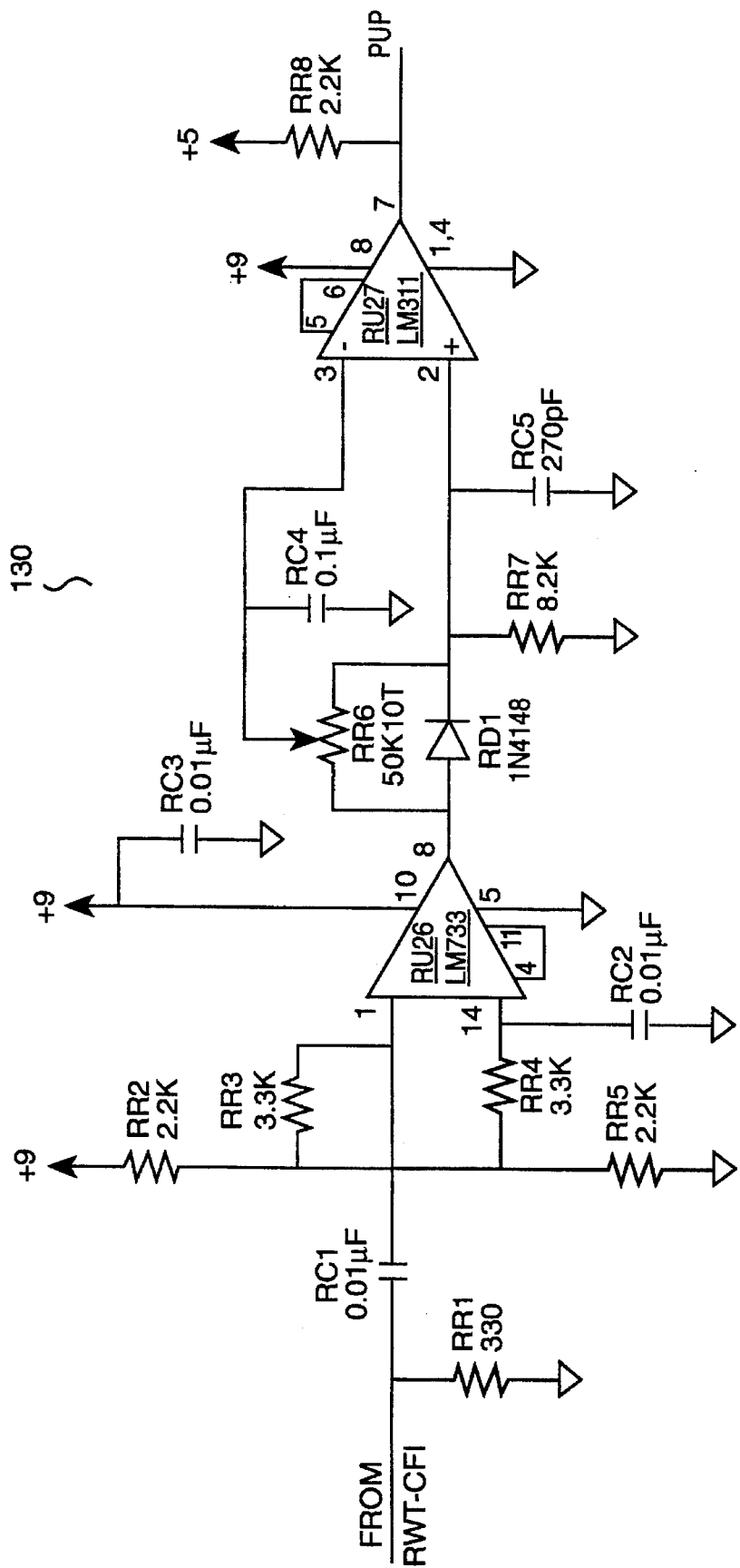

FIG. 8F is a schematic diagram of IF amplifier/comparator circuit 130. The IF signal in remote communication unit 100 may be centered, for example, at 10.7 MHz and filtered with a narrowband crystal filter (not shown). This signal is amplified by RU26 which is a wideband amplifier with a voltage gain of 400, for example. The envelope of the received RF pulses is developed by RD1, RR7, and RC5. The DC voltage drop across RD1 is also used to develop a detection threshold at pin 3 of comparator RU27. Whenever the envelope at pin 2 exceeds the threshold, the comparator output PUP goes high.

Figure 8G:
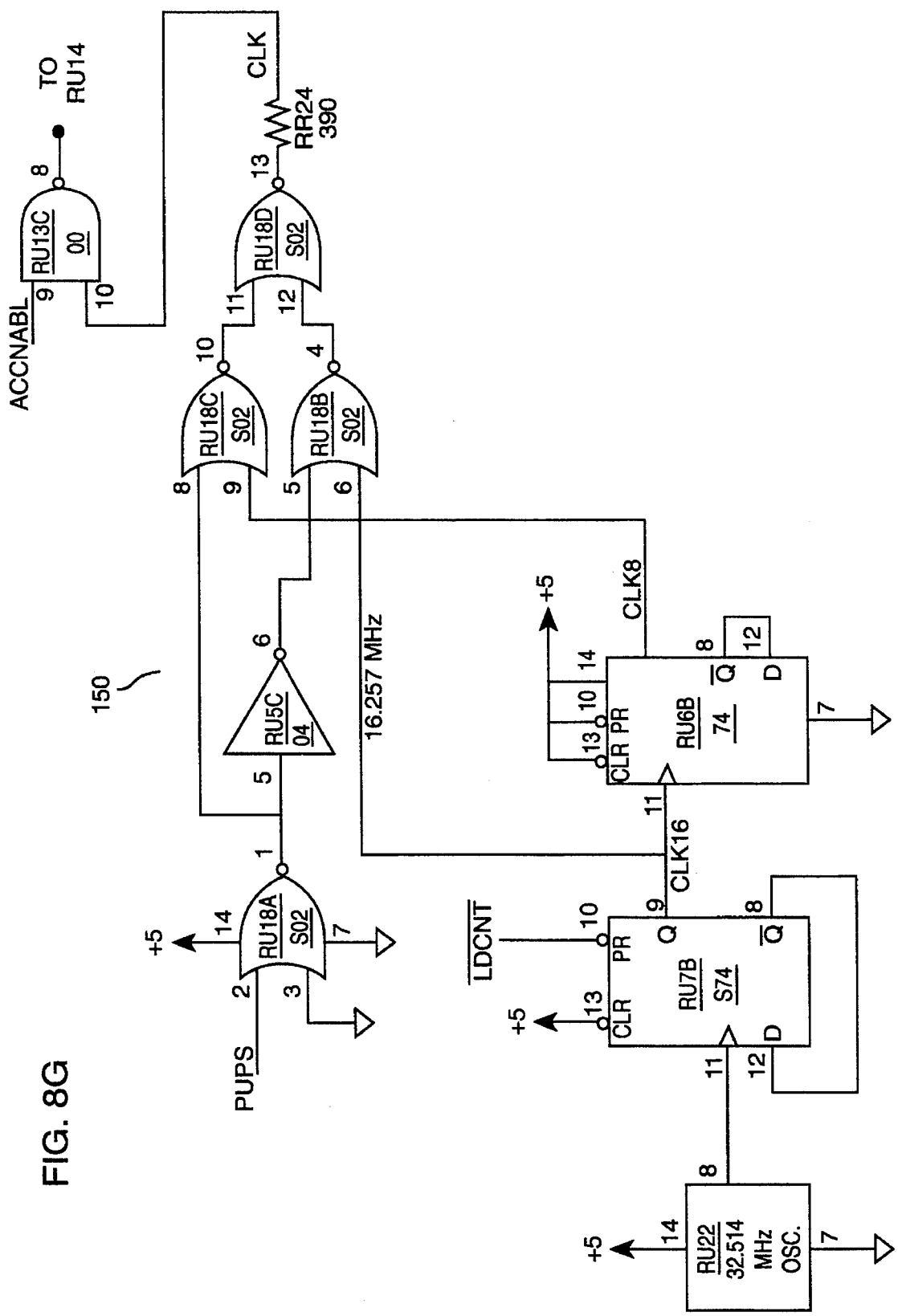

FIG. 8G is a schematic diagram of clock generating circuit 150. Clock generating circuit 150 includes a stable clock source RU22 which is a crystal oscillator operating at a frequency of 32.514 megahertz. RU7B outputs a signal CLK16 having a frequency of 16.257 megahertz and RU6B outputs a signal CLK8 having a frequency of 8.1285 megahertz. Logic gates RU18B, RU18C, and RU18D are responsive to the signal PUPS for outputting the clock signal CLK16 when elapsed time counter 160 counts up after transmission of a query signal and for outputting clock signal CLK8 when elapsed time counter 160 counts down after detection of an answer signal.

Figure 8H:
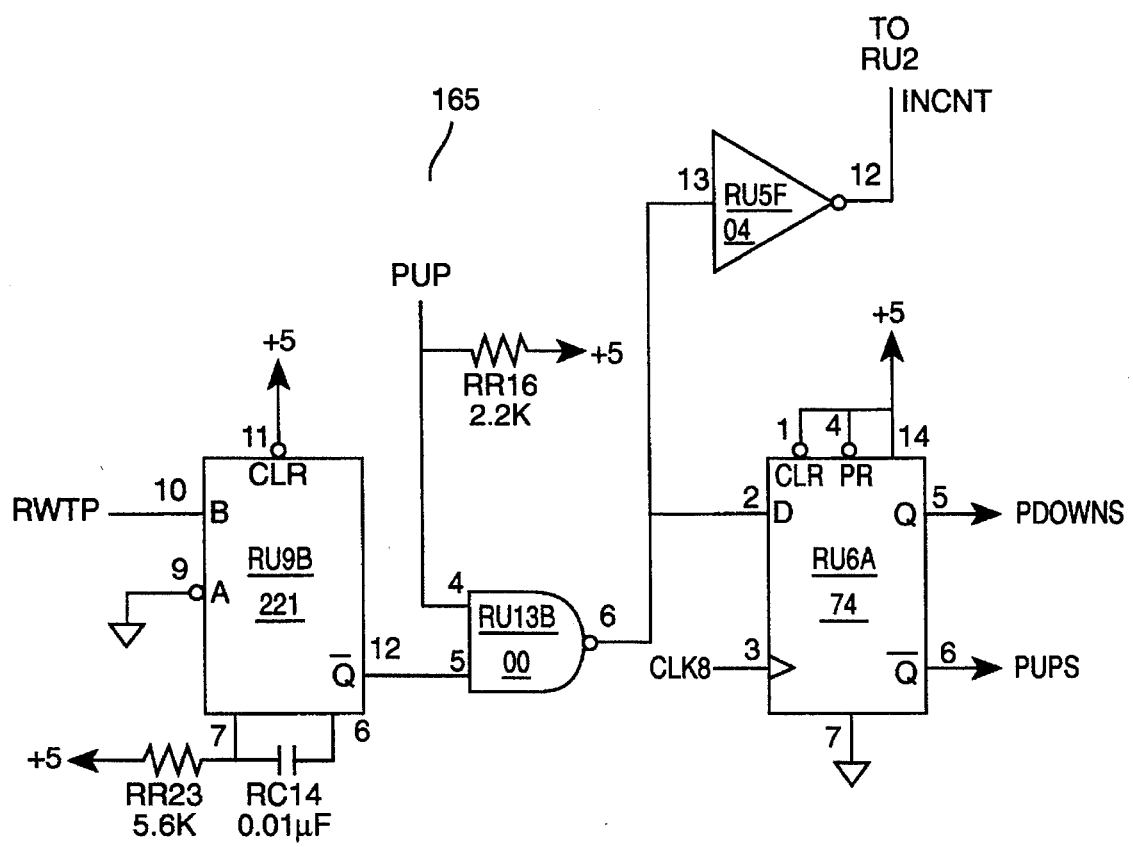

FIG. 8H is a schematic diagram of synchronization circuit 135. The assertion of the signal PUP generates the signal INCNT which is supplied to pulse counting circuit 140 for incrementing the pulse counter by one. The signal PUP is synchronized to elapsed time counter clock signal CLK8 in RU6A in order to satisfy setup and hold time specifications for the counters in the elapsed time counter. The resulting signals are PUPS and PDOWNS. PUPS is supplied to clock generating circuit 150 and causes the frequency of clock signal CLK to change from 16.257 megahertz to 8.1285 megahertz at the output of RU18D of clock generator 150 as discussed above. This half-rate clock during the received answer signal pulse results in an elapsed time measurement to the center of that pulse, thereby making the measurement less sensitive to variations in the RF pulse rise and fall times. PDOWNS is supplied to counter control circuit 145 and causes ACCNABL to enable accumulator 165 and to change the count direction in elapsed time counter 160 from up to down. Despite the fact that receiver 110 is inhibited during the time in which a query pulse is transmitted, some amount of energy is coupled into receiver 110, which can result in false detections following the transmitted pulses. These false detections are overridden by generating an inhibit pulse in RU9B, which disables the output of RU13B.

Figure 8I:
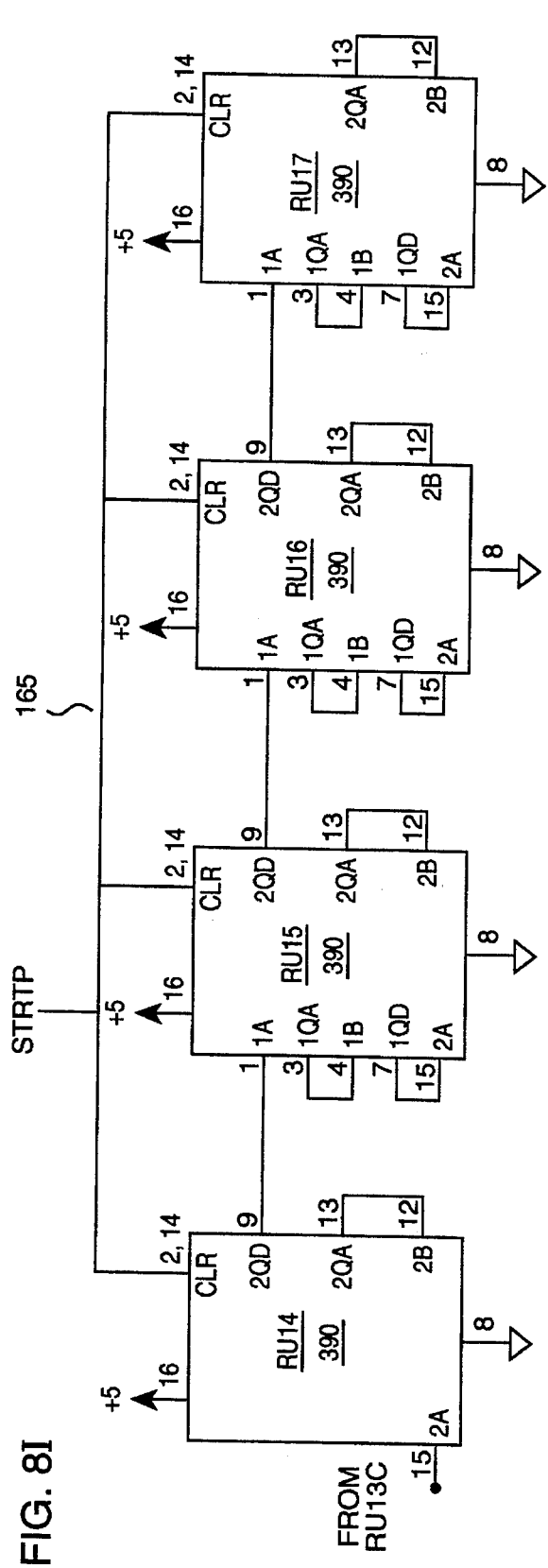

FIG. 8I is a schematic diagram of accumulator 165. Accumulator 165 includes counting circuits RU14, RU15, RU16, and RU17. Counting circuits RU14–RU17 add the 10,000 elapsed times measured by elapsed time counter 160. (While the number of measurement cycles executed according to the procedure illustrated in FIG. 6 is actually 9999, discussion herein will proceed using 10,000 as the number of measurement cycles because the resultant error is insignificant.) The division required for averaging over the 10,000 measurements is accomplished in RU14 and RU15, which divide the sum by three decades, or 1000. This is accomplished as follows. Each of RU14–RU17 comprise two decade counters. RU13C (FIG. 8G) is connected to the second decade counter of RU14. Thus, for every 10 pulses output by RU13C, one pulse is output from RU14-9. Accordingly, a division by 10 is accomplished. Similarly, the signal from RU14-9 is fed through the two decade counters of RU15. Therefore, for every one thousand pulses output by RU13C, one pulse is output from RU15-9.

Accordingly, the first decade counter of RU17 represents the most significant digit of the distance measurement and the first decade counter of RU16 represents the least significant digit of the distance measurement. (Only three digits are displayed according to a preferred embodiment.) The first decade counter of RU17 and the decade counters of RU16 are appropriately connected to display 170 such as a liquid crystal display.

Figure 8J:
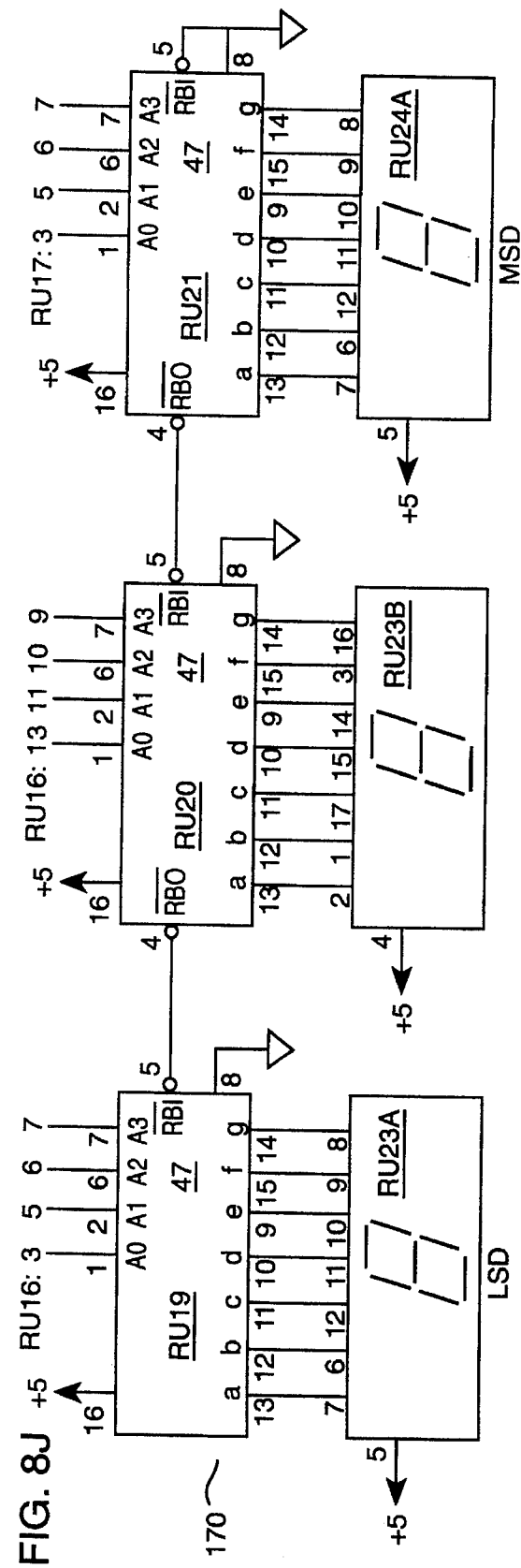

FIG. 8J is a schematic diagram of display 170. Display 170 includes drivers RU19, RU20, and RU21 which are appropriately connected to the decade counters of RU16 and RU17 of accumulator 165. Drivers RU19, RU20, and RU21 are respectively connected to display portions RU23A, RU23B, and RU24A for displaying the digits in the count of accumulator 165. The count of accumulator 165 displays the distance measurement in yards for the reasons discussed above. Because the elapsed times are random due to electrical noise in the base unit and remote unit receivers, the least significant displayed digit is not constant, and in fact provides an effective resolution of less than ten yards.

FIG. 8K is a schematic diagram of receiver inhibit circuit 120. Receiver inhibit circuit 120 includes transistors RQ1 and RQ2 and controls the biasing of an RF amplifier transistor (not shown) of the TRC-503 in remote radio communication unit 100. During a transmitted pulse, /RWTP causes transistor RQ1 to be turned off and RWTP causes transistor RQ2 to saturate, thereby pulling the base of the RF amplifier transistor of the TRC-503 to ground, and thus turning the RF amplifier transistor OFF. Since the RF amplifier transistor is the first transistor in receiver 140, receiver 140 is disabled, except for inadvertent coupling of transmitter energy into the remainder of the receiver/IF amplifiers.

FIG. 8L is a schematic diagram of transmitter inhibit circuit 125. Transmitter inhibit circuit 125 includes a transistor RQ3 whose base is connected to receive /RWTP to saturate transistor RQ3 except during transmitted RF pulses. The collector of transistor RQ3 is connected to the drive circuitry of transmitter 115, so that drive to the transmitter power amplifier is removed except during transmitted pulses.

FIG. 9 is a schematic diagram of a power supply circuit for use with remote unit 100. Five-volt power for the circuitry described above is provided by two nine-volt batteries connected in parallel, together with voltage regulator RU25.

FIG. 10A is a schematic diagram of IF amplifier/comparator 260. IF amplifier/comparator 260 is substantially identical to the remote unit IF amplifier/comparator 130 and reference should be made to the above discussion of IF amplifier/comparator 130 for a description of its operation.

FIG. 10B is a schematic diagram of control circuit 275. Control circuit 275 is responsive to the pulse detection signal PUP from IF amplifier/comparator 260. When PUP is high, transistor BQ4 saturates. In addition, BC13 begins to charge (step 1310 of FIG. 7) and the output of the inverting integrator BU2 begins to ramp upward. Consequently, at the end of the PUP signal, the voltage at the output of BU2 is a fixed constant (equal to the DC voltage at BU2-3) plus a value which is proportional to the duration of PUP. Because the voltage at BU3-2 exceeds that at BU3-3, the output of comparator BU3 is high.

FIG. 10C is a schematic diagram of inhibit circuit 280. The inhibit circuit 280 functions to prevent false pulse detections due to RF pulses transmitted by the base unit 100 by inhibiting the signal PUP asserted by IF amplifier/comparator circuit 260 from its trailing edge until just before a subsequent legitimate pulse detection can occur. The leading edge of PUP fires BU6B, which provides detecting inhibit timing (step 1310). On the trailing edge of PUP (step 1315), the collector of inverter BQ5 goes high, setting flip-flop BU5B, which in turn saturates transistor BQ6, holding PUP low (step 1320). When BU6B times out, BU5B is turned off and PUP is re-enabled.

Figure 10D:
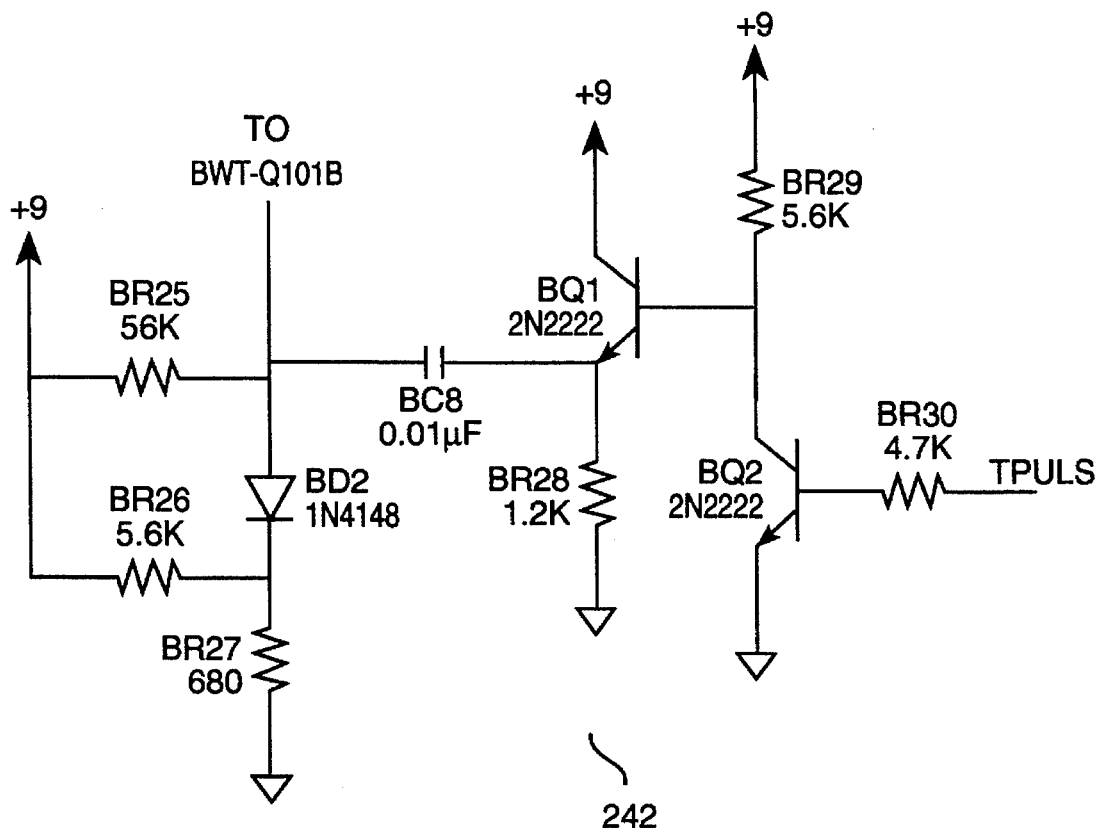

FIG. 10D is a schematic diagram of receiver inhibit circuit 242. Receiver inhibit circuit 242 includes transistors BQ1 and BQ2. Whenever the base unit transmit pulse TPULS goes high, transistor BQ2 saturates, resulting in a decrease in the voltage at the collector of BQ2 and consequently at the emitter of emitter-follower transistor BQ1. This voltage decrease is coupled to the base of a transistor in the receiver, causing that transistor to turn off, and disabling the receiver.

Figure 10E:
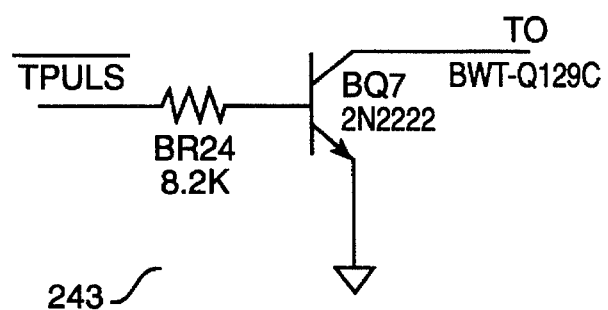

FIG. 10E is a schematic diagram of base radio communication unit transmitter inhibit circuit 243 and operates in a manner identical to the remote radio communication unit transmitter inhibit circuit 125 described above.

All circuitry in the base unit preferably operates from a 9 V battery. However, the invention is not limited in this respect.

According to a further aspect of the present invention, low frequency RF pulses of between about 10 MHz and 100 MHz are utilized. At frequencies higher than about 100 MHz, the remote unit 100 must be within the line-of-sight of the base unit 200. Therefore, by using such low frequency RF pulses, distance measurements can take place between the remote unit 100 and the base unit 200 regardless of whether the remote unit 100 is within the line-of-sight of the base unit 200. Thus, the present invention may provide non-line-of-sight distance measurements. Further, the use of RF signals avoids variations in the speed of acoustic waves due to changing environmental conditions, which can result in inaccuracies in the distance measurement.

In accordance with a preferred embodiment of the present invention, no complex circuitry is required for carrying out mathematical operations. This is due to the choice of the number of RF query/answer pulse pairs and the clock frequency and results in a device which is simple and less expensive than units which require complex circuitry for carrying out mathematical operations.

Although the query signal is described above as having a frequency of 49.89 megahertz and the answer signal as having a frequency of 46.83 megahertz, the invention is not limited in this respect and these signals may assume any frequency in the range of 10 to 100 megahertz, for example.

The present invention is not limited to the embodiment described above. In a second embodiment of the present invention, remote unit 100 discriminates between base units at different locations. When this embodiment is used to determine the distance to a pin on a golf course, the base units mounted on the pins of each hole are responsive to query signals of different frequencies. Thus, the circuitry of the remote unit transmitter may include a variable frequency oscillator, for example, to generate query pulses of different frequencies in accordance with a particular hole or hazard. Input circuitry, such as a keypad, could be used by the golfer to enter a number corresponding to the hole or hazard. The number could be used to generate a signal applied to the variable frequency oscillator to thereby generate a query signal having a frequency appropriate for the base unit being queried.

In a third embodiment, the answer signal transmitted by base unit 200 may carry information to remote unit 100 regarding conditions at the location of base unit 200. For example, when the base unit and the remote unit are used to determine the distance to a pin on a golf course, the base unit at the pin may transmit such information as wind speed, wind direction, slope of the green, etc. Alternatively, or in addition, the query pulse from the remote unit may carry information to the base unit. This information may be displayed on a display device or otherwise communicated to the user.

When the present invention is used to determine distance on a golf course, the base unit is not limited to being mounted on a pin on a green. The invention may also be used to provide a measure of the distance to a hazard such as a water hazard by mounting a base unit on a pole at the location of the hazard. Such an arrangement has particular utility since even if distances to greens are well-marked on a golf course, the distance to various hazards is often very difficult to determine. In addition, the remote unit may be mounted, for example, on a golf cart and need not be a hand-held unit.

For navigational purposes, remote unit 100 may be mounted on a boat and base unit 200 may be mounted on a buoy which marks an underwater obstacle, for example. In a variation of the above-described embodiment, remote unit 100 may periodically attempt to detect a signal at a first predetermined frequency which is emitted by the base unit mounted on the buoy. Upon such a detection, remote unit 100 carries out the above-described operation to determine the distance between the boat and buoy. If the measured distance is less than a predetermined distance such as, for example, 100 yards, a visible and/or audible alert may be provided to the boat operator along with a display of the distance.

While there has been shown and described the preferred embodiments of the invention, it will be evident to those skilled in the art that various modifications may be made thereto without departing from the spirit and scope of the invention which is set forth in the appended claims.

We claim:

1. A distance measuring system, comprising:
   a first radio unit located at a first location and a second radio unit located at a second location,
   said first radio unit comprising:
      a receiver for receiving an RF query signal from said second radio unit; and
      a transmitter responsive to said RF query signal for transmitting an RF answer signal to said second radio unit; and
   said second radio unit comprising:
      a transmitter for transmitting said RF query signal to said first radio unit;
      a receiver for receiving said RF answer signal from said first radio unit;
      counting circuitry for counting during a time beginning when said RF query signal is transmitted and ending when said RF answer signal is received so as to generate a count which corresponds to the distance between said first radio unit and said second radio unit; and
      display means coupled to said counting circuitry for displaying said count, wherein said counting circuitry comprises:
   a counter control circuit;
   a counter circuit responsive to a first signal from said counter control circuit for counting in a first direction during the time beginning when said RF query signal is transmitted and ending when said RF answer signal is received and responsive to a second signal from said counter control circuit for counting in a second direction until said counter reaches a predetermined count, said counter circuit generating a ripple signal when said counter circuit reaches the predetermined count; and an accumulator responsive to the second signal from said counter control circuit for counting in the first direction and responsive to said ripple signal for ending said counting in the first direction.

2. The distance measuring system according to claim 1, wherein said display means comprises a liquid crystal display.

3. The distance measuring system according to claim 1, wherein said counting circuitry generates a count based on a plurality of RF answer signals received by said receiver of said second radio unit in response to a sequence of transmitted RF query signals.

4. The distance measuring system according to claim 1, wherein said first control signal controls said counter to count in the first direction at a first rate and said second control signal controls said counter to count in the second direction at a second rate different than the first rate.

5. The distance measuring system according to claim 4, wherein said first rate is 16.257 megahertz and said second rate is 8.1285 megahertz.

6. The distance measuring system according to claim 1, wherein the first direction is up and the second direction is down.

7. The distance measuring system according to claim 6, wherein said ripple signal is generated when said counter underflows.

8. The distance measuring system according to claim 1, wherein said RF query signal and said RF answer signal have a frequency between 10 MHz and 100 MHz.

9. A system for measuring distance between a golfer and a location on a golf course, said system comprising:

a mobile radio unit at a location of a golfer and a stationary radio unit at said location, said stationary radio unit comprising:
a receiver for receiving RF query signals from said mobile radio unit; and
a transmitter responsive to said RF query signals for transmitting corresponding RF answer signals to said mobile radio unit; and said mobile radio unit comprising:
a transmitter for transmitting said RF query signals to said stationary radio unit;
a receiver for receiving said RF answer signals from said stationary radio unit;
counting circuitry for generating a count which is the distance between said first radio unit and said second radio unit, said counting circuitry comprising:
a counter control circuit;
a counter responsive to a first signal from said counter control circuit for counting in a first direction during the time beginning when an RF query signal is transmitted and ending when a corresponding RF answer signal is received and responsive to a second signal from said counter control circuit for counting in a second direction until said counter reaches a predetermined count, said counter generating a ripple signal when said counter reaches the predetermined count; and
an accumulator for generating said count and responsive to the second signal from said counter control circuit for counting in the first direction and responsive to said ripple signal for ending said counting in the first direction; and
display means coupled to said accumulator for displaying said count.

10. A distance measuring system, comprising:

a first radio unit located at a first location and a second radio unit located at a second location, said first radio unit comprising:
a receiver for receiving RF query signals from said second radio unit; and
a transmitter responsive to said RF query signals for transmitting respective corresponding RF answer signals to said second radio unit; and said second radio unit comprising:
a transmitter for transmitting said RF query signals to said first radio unit;
a receiver for receiving said RF answer signals from said first radio unit;
an elapsed time counter for generating a plurality of elapsed time counts each corresponding to a time which begins when an RF query signal is transmitted to said first radio unit and ends when the respective corresponding RF answer signal is received from said first radio unit; and
an accumulator for accumulating a sum of a plurality of respective elapsed time counts, wherein said sum corresponds to the distance between said first and second radio units.

11. The distance measuring system according to claim 10, wherein, during the time which begins when an RF query signal is transmitted to said first radio unit and ends when the respective corresponding RF answer signal is received from said first radio unit, said elapsed time counter counts up at a first rate, and, when the respective corresponding RF answer signal is received from said first radio unit, said elapsed time counter counts down at a second rate to a predetermined count while said accumulator counts up until said elapsed time counter reaches the predetermined count.

12. The distance measuring system according to claim 11, wherein the first rate is 16.257 megahertz and said accumulator accumulates a sum of 10,000 respective elapsed time counts, whereby the accumulated sum is divisible by 1000 to yield a distance in yards between said first and second radio units.

13. The distance measuring system according to claim 11, wherein said second radio unit further comprises:

a display for displaying the distance between said first and second radio units.

14. A radio unit for use in a distance measuring system, comprising:

a transmitter for transmitting query signals to a remotely located radio unit;

a receiver for receiving answer signals from said remotely located radio unit, each of said answer signals respectively corresponding to one of said query signals;

an elapsed time counter for generating a plurality of elapsed time counts each corresponding to a time which begins when a query signal is transmitted to said remotely located radio unit and ends when the respective corresponding answer signal is received from said remotely located radio unit; and an accumulator for accumulating a sum of a plurality of respective elapsed time counts, wherein said sum corresponds to the distance between said first and second radio units.

15. The radio unit according to claim 14, wherein, during the time which begins when a query signal is transmitted to said remotely located radio unit and ends when the respective corresponding answer signal is received from said remotely located radio unit, said elapsed time counter counts up at a first rate, and, when the respective corresponding RF answer signal is received from said remotely located radio unit, said elapsed time counter counts down at a second rate to a predetermined count while said accumulator counts up until said elapsed time counter reaches the predetermined count.

16. The radio unit according to claim 14, wherein said elapsed time count counts at a frequency of 16.257 megahertz and said accumulator accumulates a sum of 10,000 elapsed time counts, whereby the accumulated sum is divisible by 1000 to yield a distance in yards between said radio unit and said remotely located radio unit.

17. The radio unit according to claim 14, further comprising:
 a display for displaying the distance between said radio unit and said remotely located radio unit.

18. A radio unit for use in a distance measuring system, comprising:
 a transmitter for transmitting an RF query signal to a remotely located radio unit;
 a receiver for receiving an RF answer signal from said remotely located radio unit, said RF answer signal corresponding to said RF query signal;
 determining means coupled to said receiver for determining an arrival of the center of said corresponding RF answer signal received from said remotely located radio unit; and
 an elapsed time counter for generating an elapsed time count corresponding to a time which begins when the RF query signal is transmitted to said remotely located radio unit and ends when the center of said corresponding RF answer signal received from said remotely located unit arrives as determined by said determining means.

19. The radio unit according to claim 18, further comprising:
 an accumulator, wherein
  said transmitter transmits a plurality of query signals to said remotely located radio unit,
  said receiver receives a plurality of RF answer signals from said remotely located radio unit, each of said RF answer signals respectively corresponding to one of said RF query signals,
  said elapsed time counter generates a plurality of elapsed time counts each corresponding to a time which begins when an RF query signal is transmitted to said remotely located radio unit and ends when the center of the respective corresponding RF answer signal arrives as determined by said determining means, and
  said accumulator accumulates a sum of a plurality of elapsed time counts, said sum corresponding to a distance between said radio unit and said remotely located radio unit.

20. The radio unit according to claim 19, further comprising:
 display means for displaying the distance between said radio unit and said remotely located radio unit.

* * * * *